(12) United States Patent
Fan

(10) Patent No.: US 11,989,948 B1
(45) Date of Patent: May 21, 2024

(54) ACCELERATED NON-MAXIMUM SUPPRESSION IN MACHINE LEARNING APPLICATIONS

(71) Applicant: NVIDIA Corporation, Santa Clara, CA (US)

(72) Inventor: Zhimeng Fan, Shanghai (CN)

(73) Assignee: Nvidia Corporation, Santa Clara, CA (US)

( * ) Notice: Subject to any disclaimer, the term of this patent is extended or adjusted under 35 U.S.C. 154(b) by 407 days.

(21) Appl. No.: 17/500,167

(22) Filed: Oct. 13, 2021

(51) Int. Cl.
  *G06V 20/58* (2022.01)
  *G06F 7/24* (2006.01)
  *G06F 7/499* (2006.01)
  *G06F 18/2431* (2023.01)

(52) U.S. Cl.
  CPC ............... *G06V 20/58* (2022.01); *G06F 7/24* (2013.01); *G06F 7/49915* (2013.01); *G06F 18/2431* (2023.01)

(58) Field of Classification Search
  CPC ....... G06V 20/58; G06F 7/24; G06F 7/49915; G06F 18/2431
  See application file for complete search history.

(56) References Cited

U.S. PATENT DOCUMENTS

| | | | |
|---|---|---|---|
| 10,839,245 B1 * | 11/2020 | Dhillon | G06F 18/217 |
| 2017/0090817 A1 * | 3/2017 | Cho | G06F 7/24 |
| 2020/0320736 A1 * | 10/2020 | Zhang | G06V 10/751 |
| 2022/0300739 A1 * | 9/2022 | Xie | G06T 5/00 |

\* cited by examiner

*Primary Examiner* — Edward F Urban
*Assistant Examiner* — Wassim Mahrouka
(74) *Attorney, Agent, or Firm* — Lowenstein Sandler LLP

(57) ABSTRACT

Apparatuses, systems, and techniques to perform non-maximum suppression (NMS) with a bit-reduced radix sort to remove redundant bounding boxes are described. In at least one embodiment, one or more circuits perform i) a bit-reduced radix sort operation to sort a list of confidence scores associated with a set of bounding boxes corresponding to one or more objects within one or more digital images and ii) a non-maximum suppression (NMS) operation on the sorted list to remove one or more redundant bounding boxes from the set.

20 Claims, 21 Drawing Sheets

ACCELERATED NON-MAXIMUM SUPPRESSION IN MACHINE LEARNING APPLICATIONS

TECHNICAL FIELD

At least one embodiment pertains to processing resources used to perform and facilitate artificial intelligence. For example, at least one embodiment pertains to processors or computing systems used to train and use neural networks according to various novel techniques described herein.

BACKGROUND

Neural networks can be used for object detection tasks. A neural network can perform an object detection task that identifies one or more bounding boxes in which an object is detected and provides a confidence score for each bounding box. An object detection task can identify multiple overlapping candidate windows around an object with similar scores. A suppression algorithm can be used to remove redundant bounding boxes.

BRIEF DESCRIPTION OF DRAWINGS

Various embodiments in accordance with the present disclosure will be described with reference to the drawings, in which.

DETAILED DESCRIPTION

Inference and Training Logic

Figure 1A:
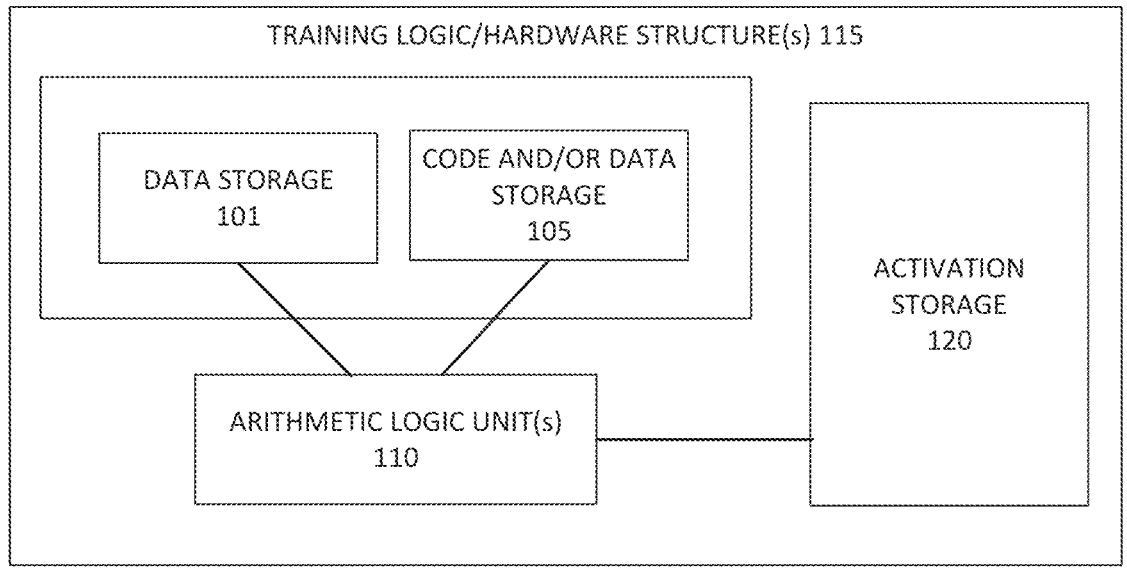
FIG. 1A illustrates inference and/or training logic, according to at least one embodiment.

FIG. 1A illustrates inference and/or training logic 115 used to perform inferencing and/or training operations associated with one or more embodiments. Details regarding inference and/or training logic 115 are provided below in conjunction with FIGS. 1A and/or 1B.

In at least one embodiment, inference and/or training logic 115 may include, without limitation, code and/or data storage 101 to store forward and/or output weight and/or input/output data, and/or other parameters to configure neurons or layers of a neural network trained and/or used for inferencing in aspects of one or more embodiments. In at least one embodiment, training logic 115 may include, or be coupled to code and/or data storage 101 to store graph code or other software to control timing and/or order, in which weight and/or other parameter information is to be loaded to configure, logic, including integer and/or floating-point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 101 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 101 may be included with other on-chip or off-chip data storage, including a processor's L1, L2, or L3 cache or system memory.

In at least one embodiment, any portion of code and/or data storage 101 may be internal or external to one or more processors or other hardware logic devices or circuits. In at least one embodiment, code and/or code and/or data storage 101 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 101 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 115 may include, without limitation, a code and/or data storage 105 to store backward and/or output weight and/or input/output data corresponding to neurons or layers of a neural network trained and/or used for inferencing in aspects of one or more embodiments. In at least one embodiment, code and/or data storage 105 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 115 may include, or be coupled to code and/or data storage 105 to store graph code or other software to control timing and/or order, in which weight and/or other parameter information is to be loaded to configure, logic, including integer and/or floating-point units (collectively, arithmetic logic units (ALUs).

In at least one embodiment, code, such as graph code, causes loading of weight or other parameter information into processor ALUs based on an architecture of a neural network to which such code corresponds. In at least one embodiment, any portion of code and/or data storage 105 may be included with other on-chip or off-chip data storage, including a processor's L1, L2, or L3 cache or system memory. In at least one embodiment, any portion of code and/or data storage 105 may be internal or external to one or more processors or other hardware logic devices or circuits. In at least one embodiment, code and/or data storage 105 may be cache memory, DRAM, SRAM, non-volatile memory (e.g., flash memory), or other storage. In at least one embodiment, a choice of whether code and/or data storage 105 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 101 and code and/or data storage 105 may be separate storage structures. In at least one embodiment, code and/or data storage 101 and code and/or data storage 105 may be a combined storage structure. In at least one embodiment, code and/or data storage 101 and code and/or data storage 105 may be partially combined and partially separate. In at least one embodiment, any portion of code and/or data storage 101 and code and/or data storage 105 may be included with other on-chip or off-chip data storage, including a processor's L1, L2, or L3 cache or system memory.

In at least one embodiment, inference and/or training logic 115 may include, without limitation, one or more arithmetic logic unit(s) ("ALU(s)") 110, including integer and/or floating-point units, to perform logical and/or mathematical operations based, at least in part on, or indicated by, training and/or inference code (e.g., graph code), a result of which may produce activations (e.g., output values from layers or neurons within a neural network) stored in an activation storage 120 that are functions of input/output and/or weight parameter data stored in code and/or data storage 101 and code and/or data storage 105. In at least one embodiment, activations stored in activation storage 120 are generated according to linear algebraic and or matrix-based mathematics performed by ALU(s) 110 in response to performing instructions or other code, wherein weight values stored in code and/or data storage 105 and/or data storage 101 are used as operands along with other values, such as bias values, gradient information, momentum values, or other parameters or hyperparameters, any or all of which may be stored in code and/or data storage 105 or code and/or data storage 101 or another storage on or off-chip.

In at least one embodiment, ALU(s) 110 are included within one or more processors or other hardware logic devices or circuits, whereas in at least one other embodiment, ALU(s) 110 may be external to a processor or other hardware logic device or circuit that uses them (e.g., a co-processor). In at least one embodiment, ALUs 110 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 101, code and/or data storage 105, and activation storage 120 may share a processor or other hardware logic device or circuit, whereas in at least one other embodiment, they may be in different processors or other hardware logic devices or circuits, or some combination of same and different processors or other hardware logic devices or circuits. In at least one embodiment, any portion of activation storage 120 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 120 may be cache memory, DRAM, SRAM, non-volatile memory (e.g., flash memory), or other storage. In at least one embodiment, activation storage 120 may be completely or partially within or external to one or more processors or other logical circuits. In at least one embodiment, a choice of whether activation storage 120 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 115 illustrated in FIG. 1A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 115 illustrated in FIG. 1A may be used in conjunction with central processing unit ("CPU") hardware, graphics processing unit ("GPU") hardware or other hardware, such as field programmable gate arrays ("FPGAs").

Figure 1B:
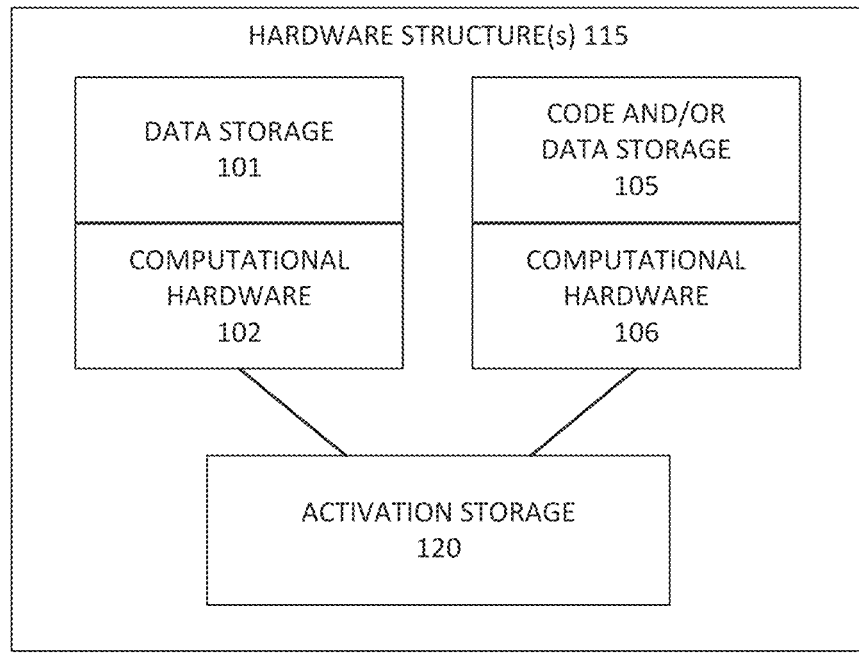
FIG. 1B illustrates inference and/or training logic, according to at least one embodiment.

FIG. 1B illustrates inference and/or training logic 115, according to at least one embodiment. In at least one embodiment, inference and/or training logic 115 may include, without limitation, hardware logic in which computational resources are dedicated or otherwise exclusively used in conjunction with weight values or other information corresponding to one or more layers of neurons within a neural network. In at least one embodiment, inference and/or training logic 115 illustrated in FIG. 1B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 115 illustrated in FIG. 1B may be used in conjunction with central processing unit (CPU) hardware, graphics processing unit (GPU) hardware or other hardware, such as field programmable gate arrays (FPGAs). In at least one embodiment, inference and/or training logic 115 includes, without limitation, code and/or data storage 101 and code and/or data storage 105, which may be used to store code (e.g., graph code), weight values and/or other information, including bias values, gradient information, momentum values, and/or other parameter or hyperparameter information. In at least one embodiment illustrated in FIG. 1B, each of code and/or data storage 101 and code and/or data storage 105 is associated with a dedicated computational resource, such as computational hardware 102 and computational hardware 106, respectively. In at least one embodiment, each of computational hardware 102 and computational hardware 106 comprises one or more ALUs that perform mathematical functions, such as linear algebraic functions, only on information stored in code and/or data storage 101 and code and/or data storage 105, respectively, result of which is stored in activation storage 120.

In at least one embodiment, each of code and/or data storage 101 and 105 and corresponding computational hardware 102 and 106, respectively, correspond to different layers of a neural network, such that resulting activation from one storage/computational pair 101/102 of code and/or data storage 101 and computational hardware 102 is provided as an input to a next storage/computational pair 105/106 of code and/or data storage 105 and computational hardware 106, in order to mirror a conceptual organization of a neural network. In at least one embodiment, each of storage/computational pairs 101/102 and 105/106 may correspond to more than one neural network layer. In at least one embodiment, additional storage/computation pairs (not shown) subsequent to or in parallel with storage/computation pairs 101/102 and 105/106 may be included in inference and/or training logic 115.

Neural Network Training and Deployment

Figure 2:
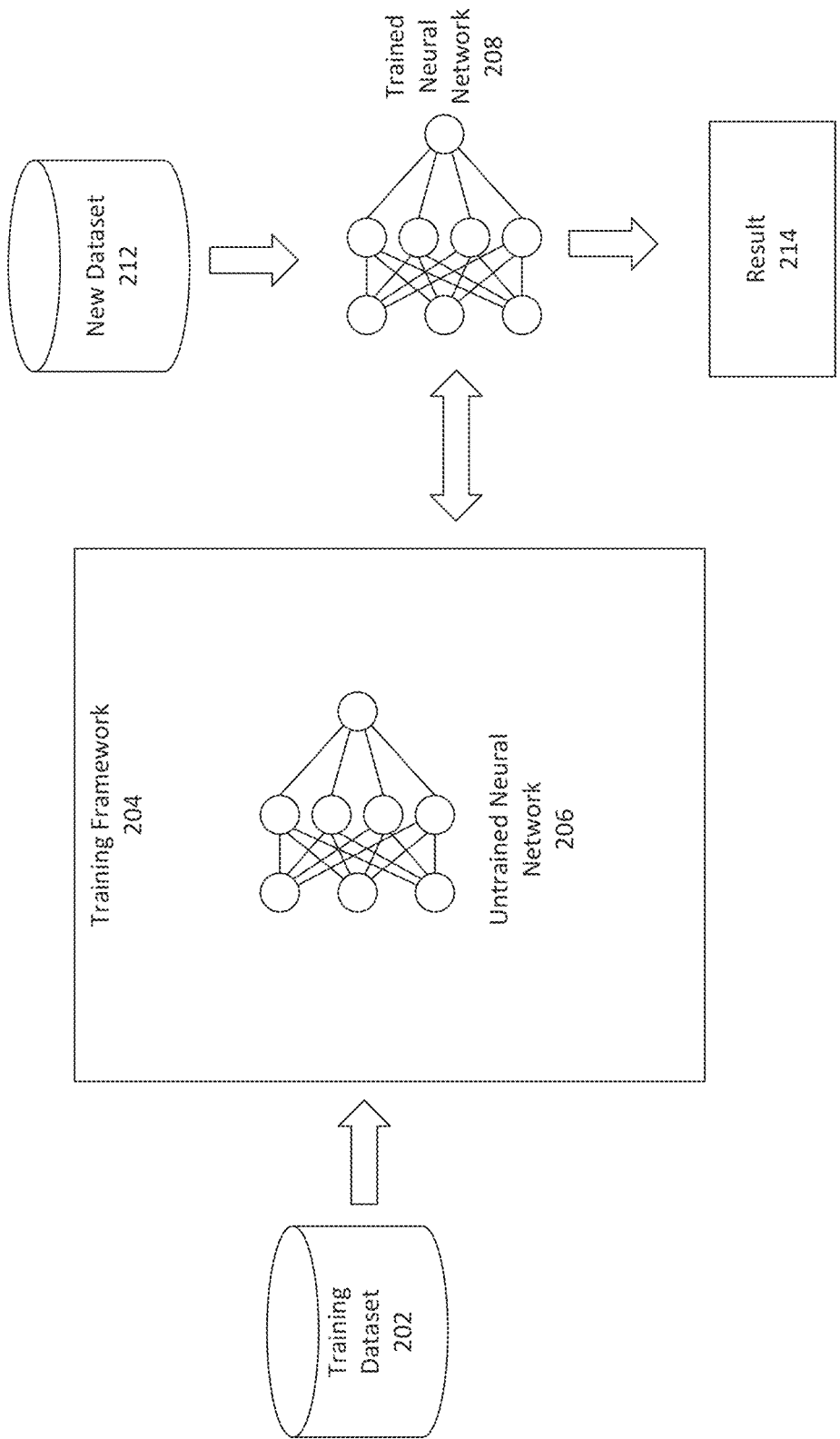
FIG. 2 illustrates training and deployment of a neural network, according to at least one embodiment.

FIG. 2 illustrates training and deployment of a deep neural network, according to at least one embodiment. In at least one embodiment, untrained neural network 206 is trained using a training dataset 202. In at least one embodiment, training framework 204 is a PyTorch framework, whereas in other embodiments, training framework 204 is a TensorFlow, Boost, Caffe, Microsoft Cognitive Toolkit/CNTK, MXNet, Chainer, Keras, Deeplearning4j, or other training framework. In at least one embodiment, training framework 204 trains an untrained neural network 206 and enables it to be trained using processing resources described herein to generate a trained neural network 208. In at least one embodiment, weights may be chosen randomly or by pre-training using a deep belief network. In at least one embodiment, training may be performed in either a supervised, partially supervised, or unsupervised manner.

In at least one embodiment, untrained neural network 206 is trained using supervised learning, wherein training dataset 202 includes an input paired with a desired output for an input, or where training dataset 202 includes input having a known output and an output of neural network 206 is manually graded. In at least one embodiment, untrained neural network 206 is trained in a supervised manner and processes inputs from training dataset 202 and compares resulting outputs against a set of expected or desired outputs. In at least one embodiment, errors are then propagated back through untrained neural network 206. In at least one embodiment, training framework 204 adjusts weights that control untrained neural network 206. In at least one embodiment, training framework 204 includes tools to monitor how well untrained neural network 206 is converging towards a model, such as trained neural network 208, suitable to generating correct answers, such as in result 214, based on input data such as a new dataset 212. In at least one embodiment, training framework 204 trains untrained neural network 206 repeatedly while adjust weights to refine an output of untrained neural network 206 using a loss function and adjustment algorithm, such as stochastic gradient descent. In at least one embodiment, training framework 204 trains untrained neural network 206 until untrained neural network 206 achieves a desired accuracy. In at least one embodiment, trained neural network 208 can then be deployed to implement any number of machine learning operations.

In at least one embodiment, untrained neural network 206 is trained using unsupervised learning, wherein untrained neural network 206 attempts to train itself using unlabeled data. In at least one embodiment, unsupervised learning training dataset 202 will include input data without any associated output data or "ground truth" data. In at least one embodiment, untrained neural network 206 can learn groupings within training dataset 202 and can determine how individual inputs are related to untrained dataset 202. In at least one embodiment, unsupervised training can be used to generate a self-organizing map in trained neural network 208 capable of performing operations useful in reducing dimensionality of new dataset 212. In at least one embodiment, unsupervised training can also be used to perform anomaly detection, which allows identification of data points in new dataset 212 that deviate from normal patterns of new dataset 212.

In at least one embodiment, semi-supervised learning may be used, which is a technique in which in training dataset 202 includes a mix of labeled and unlabeled data. In at least one embodiment, training framework 204 may be used to perform incremental learning, such as through transferred learning techniques. In at least one embodiment, incremental learning enables trained neural network 208 to adapt to new dataset 212 without forgetting knowledge instilled within trained neural network 208 during initial training.

Bit-Reduced Sorting for NMS

Embodiments described below are directed to accelerating non-maximum suppression (NMS) of bounding boxes (and/or other bounding shapes such as circles, ellipses, etc.) in connection with an object detection task. Object detection based on deep learning models has been widely adopted since the renaissance of deep neural networks (DNN, a.k.a. Deep Learning). Although object detection models have evolved for several years ever since and have numerous different architectures, most of the object detection models nowadays (e.g., SSD, YOLO, FasterRCNN, MaskRCNN, etc.) have a post-processing module, called NMS. NMS is an algorithm that removes redundant bounding boxes (and/or other bounding shapes) for an object detection task, such as performed by an object detection pipeline. The functionality of NMS computation is to take the dense bounding boxes of detected objects as input, perform clustering of them based on the bounding boxes' overlapping ratio, and produce a sparse set of bounding boxes whose overlapping ratio is reduced. Existing NMS algorithms may sort a list of bounding boxes (and/or other bounding shapes) in a descending order of confidence values and compute an intersection over union (IoU) value between all candidate boxes. In particular, the confidence scores per class are sorted in descending order and the confidence scores per image are sorted in descending order after the suppression operation is performed on all classes. The confidence scores can be floating-point numbers in any format where its internal bit representation is comprised of a sign field, an exponent field, and a fraction field. In some examples, the confidence scores can be floating-point numbers represented in the IEEE 754 format (e.g., FP32 or FP16 numbers). In another example, the confidence scores can be floating point numbers represented in the Bfloat16 format. The confidence scores can be in a range of [a, b]. In some examples, the confidence scores can be in a range between [0, 1]. Existing sorting approaches rely on the use of the full bits that represent the value of the confidence scores. Sorting an arbitrary list of floating-point numbers, even floating-point numbers in the [0, 1] range, is time-consuming.

Aspects and embodiments of the present disclosure address these and other challenges by providing a bit-reduced sorting that transforms the confidence scores so that they can be sorted with less than all of the full bits. Aspects and embodiments of the present disclosure can accelerate sorting as compared to existing sorting approaches for NMS computations. In at least one embodiment, the new bit-reduced radix sorting can transform floating-point numbers in an internal bit representation of a format (e.g., the IEEE 754 format or the Bfloat16 format) to a specified range such that a portion of the internal bit representation of each transformed confidence score is the same, leaving fewer bits of the confidence scores that are different to be used for sorting the confidence scores. In particular, a floating-point number in the IEEE format specifies a sign bit, a biased-exponent field, and a mantissa field (fractional part). In another embodiment, the new bit-reduced radix sorting can transform floating-point numbers in any format that specifies a sign field, an exponent field, and a fractional field. After the transformation, all confidence scores have the same sign bit, the same biased-exponent field, and possibly different mantissa fields. The bits corresponding to the different mantissa fields can be used for sorting the confidence scores quicker than sorting using all of the bits as described in more detail below with respect to FIG. 3.

Figure 3:
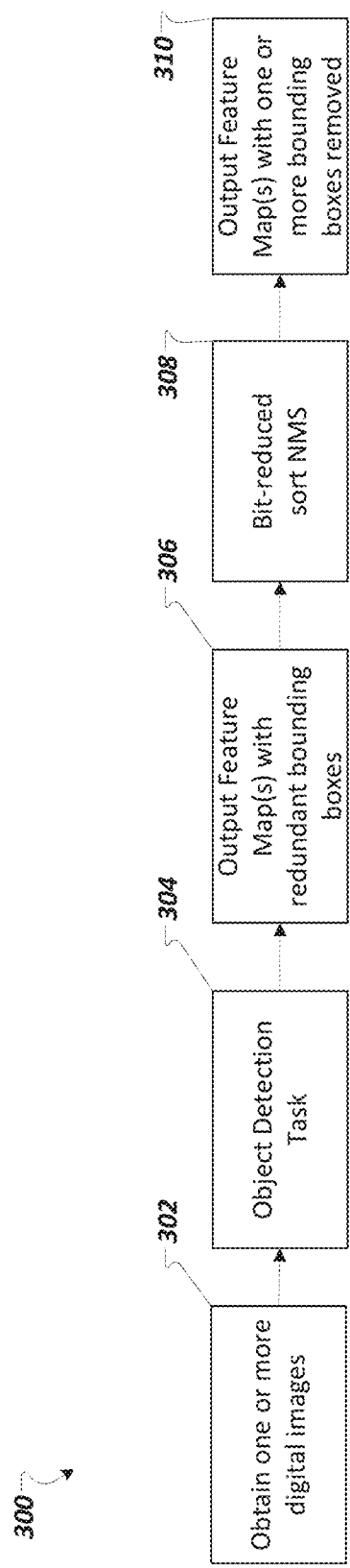
FIG. 3 is an example data flow diagram for a process to perform non-maximum suppression (NMS) with bit-reduced sorting, according to at least one embodiment.

FIG. 3 is an example data flow diagram for a method 300 to perform NMS with bit-reduced sorting, according to at least one embodiment. In at least one embodiment, method 300 is performed by inference and/or training logic 115. Details regarding inference and/or training logic 115 are provided herein in conjunction with FIGS. 1A and/or 1B. In at least one embodiment, inference and/or training logic 115 may be used in the system of FIG. 1B for inferencing or predicting operations based, at least in part, on weight parameters calculated using neural network training operations, neural network functions and/or architectures, or neural network use cases described herein.

Referring to FIG. 3, in at least one embodiment, processing logic obtains (e.g., retrieves from a data store) one or more digital images (block 302), and performs an object detection task to detect one or more objects within one or more digital images (block 304). In at least one embodiment, at block 304, processing logic uses a DNN to perform the object detection task. In at least one embodiment, at block 304, processing logic uses a CNN detector in which it slides a window around an image and extracts features (e.g., edges, corners, blobs, ridges, edge direction, borders, shapes, etc.) for classification. Classification of features can determine whether an object is contained within a window. In at least one embodiment at block 304, processing logic classifies features extracted in the window and accepts the window as a candidate bounding box if a score of extracted features is above a threshold (also referred to as a positive candidate bounding box). In a detection phase, an image can be scanned at one or more windows of varying sizes and locations and features can be extracted from one or more windows of varying sizes. A classifier can be run on all scales of an image (image sizes) and can determine confidence scores, indicative of whether a window contains an object. A point in a confidence feature map can correspond to a candidate bounding box or multiple candidate bounding boxes. It should be noted that any discussion of bounding boxes herein also applies to other types of bounding shapes.

In at least one embodiment, one or more feature maps with multiple bounding boxes can be obtained from an output of a trained machine learning model such as an artificial neural network. One example artificial neural network that may be used to generate bounding boxes is a convolutional neural network (CNN). One or more CNNs can be trained to receive images as input and to output bounding boxes around one or more regions and/or objects from said input images. The one or more CNNs can be trained to perform object detection and/or object recognition for one or more types of objects, for example, and to generate one or multiple bounding boxes around detected and/or recognized objects. In at least one embodiment, a CNN outputs multiple bounding boxes that are associated with a same object, region or feature in an image. Each output bounding box may be associated with or include a confidence value and/or a probability value. In at least one embodiment, one or more feature maps with multiple bounding boxes are obtained from a forward inference layer of a neural network (e.g., a CNN). One or more digital images can be received by a trained neural network that outputs an output feature map with multiple bounding boxes.

In at least one embodiment, processing logic outputs one or more output feature maps with multiple bounding boxes and corresponding confidence scores, where an output feature map can include multiple points each corresponding to a bounding box and having a confidence score, and can have multiple redundant bounding boxes (block 306). In at least one embodiment, an output of an DNN model is a tensor of shape (N, C, 5), where N is the batch size, C is the number of classes, and 5 is the number of bounding box coordinates (4) plus the confidence score (1) for this bounding box. In at least one embodiment, for output confidence feature map F(M,N) where each point is p∈F(M, N), a delete mask delete_mask is used, where delete_mask=D(M,N). In at least one embodiment, each flag in delete_mask indicates whether a certain box should be deleted.

In at least one embodiment, instead of performing NMS with sorting operations that use the full bits, processing logic performs NMS with bit-reduced sorting operations to remove one or more redundant bounding boxes corresponding to one or more objects within one or more digital images (block 308). In at least one embodiment, the bit-reduced sorting operation is a bit-reduced radix sort operation. As described above, the NMS computation clusters bounding boxes based on the bounding boxes' overlapping ratio. The formal mathematical definition of overlapping ratio is called Intersection over Union (IoU). By its name, IoU is defined as the ratio of two bounding boxes' area of intersection and area of union as expressed in equation (1) below:

$$IoU = \text{Area of intersection} / \text{Area of union}.$$

Since the intersection of two boxes can be no more than their union, the IoU is between [0, 1]. For example, a DNN model can output a feature map with multiple bounding boxes for an object (e.g., a car). The NMS algorithm can determine that two bounding boxes have an overlapping ratio of 0.9, and belong to the same class, providing enough confidence to deduce the two bounding boxes are actually for the same object. The NMS algorithm can retain the bounding box with the highest confidence score. In contrast, when the NMS algorithm determines that two bounding boxes have an overlapping ratio of 0.3, the NMS algorithm can deduce that the two bounding boxes are for different objects and both bounding boxes are retained. Each bounding box also has an associated confidence score predicted by the DNN model and it can be determined which box has higher confidence score. The DNN model can detect multiple classes of objects and the NMS operations can be done per class since the highly overlapped boxes are for the same objects only if the two bounding boxes' underlying objects belong to the same class.

The computation of NMS at block 308 can have three operations executed in order, including 1) a first operation to sort scores per class, 2) a second operation to perform all-class NMS, and 3) a third operation to sort scores per image. For each image in a batch, the three operations can be independent from the operations to be performed for the rest of the images in this batch, so the computation can be accelerated by parallelizing it for different images on a GPU. Since NMS operations are done on a per-class basis, the first operation can sort the confidence scores per class. For example, if an object detection model has C classes of objects, then there will be C per-class NMS operations in total. In at least one embodiment, an output of an DNN model is a tensor of shape (N, C, 5), where N is the batch size, C is the number of classes, and 5 is the number of bounding box coordinates (4) plus the confidence score (1) for this box. So, for each incoming bounding box, the NMS algorithm can receive its coordinates on the image and the confidence score (also referred to as a confidence score value). Regarding the first operation, the confidence scores per class can be sorted in descending order, for each image in the batch. This can be a prerequisite operation for doing the per-class NMS in the second operation.

For the all-class NMS operation at block 308, once all the bounding boxes are sorted by their confidence score from high to low, a suppression operation can be performed for each class. Since these are all done together, it is called all-class NMS. Since different classes can be processed independently of each other, a suppression operation for a single class is only described. The suppression operation can receive an input list of candidate bounding boxes sorted in descending order (per class) and generate an output list of bounding boxes to be retained. This output list can grow during the suppression operation. Once the suppression finishes, the output list is output with one or more redundant bounding boxes removed. The initial item in the output list is a single element or single point that represents the first bounding box in the sorted list of candidate bounding boxes. The bounding box with the highest confidence score should not be eliminated from the output list. In at least one embodiment, the single element or single point can be part of a confidence feature map that is output by an object detection model. A point in a confidence feature map can correspond to a candidate bounding box or multiple candidate bounding boxes. After the first bounding box is added to the output list, the remaining boxes in the order of their respective confidence scores (next highest to lowest) are considered for being added to the output list. To be added to the output list, the suppression operation computes the IoU value between the bounding box having the highest confidence score in the output list and the next candidate box. If any IoU value is higher than a specified threshold (e.g., 0.7), then the candidate box is determined to be a redundant bounding box and is not added to the list (i.e., is eliminated as a bounding box). Otherwise, if the IoU value is not higher than the specified threshold, the candidate box is added to the output list as a new candidate bounding box. The lower IoU value indicates that the bounding box is pertaining to a different object. The suppression operation is continued until the end of the incoming list of bounding boxes. When the suppression operation is finished, the output list will contain a final result of the all-class NMS.

In some cases, once the final result of the all-class NMS is obtained, the total number of boxes can still be larger than a desired number of boxes wanted for each image. To further reduce the number of bounding boxes, all the boxes can be sorted in descending order regardless of their class according to their confidence score. After the list of all remaining boxes are sorted in descending order, a specified number (e.g., top K number) of bounding boxes with the highest confidence scores can be retained, discarding any remaining bounding boxes.

In at least one embodiment, processing logic completes the operations at block 802 and outputs one or more output feature maps with one or more redundant bounding boxes removed (block 310).

The execution of the first operation to sort scores per class and the third operation to sort scores per image can take the majority of the total time of the NMS computations. The sorting operations can slow down operations of the NMS computations. To speed up the sorting operations, fast sorting algorithms like a radix sort can be used. In at least one embodiment, the confidence scores are floating-point numbers and can be represented as IEEE 754 standard for FP32 or FP16 numbers. In another embodiment, the floating-point numbers can be represented as any floating-point standard that specifies a sign field, an exponent field, and a fractional field. In yet another embodiment, the floating-point number can be quantized to make it an 8-bit integer (INT8).

As described above, existing NMS algorithms sort the confidence scores using the full bits that are used to represent the value of the confidence scores. That is, 32 bits for FP32 and 16 bits for FP16, 8 bits for INT8 are used for the sorting operations. In at least one embodiment, the sorting operations sort the confidence scores with less number of bits than necessary to represent their values, as described in more detail below with respect to FIG. 4.

Figure 4:
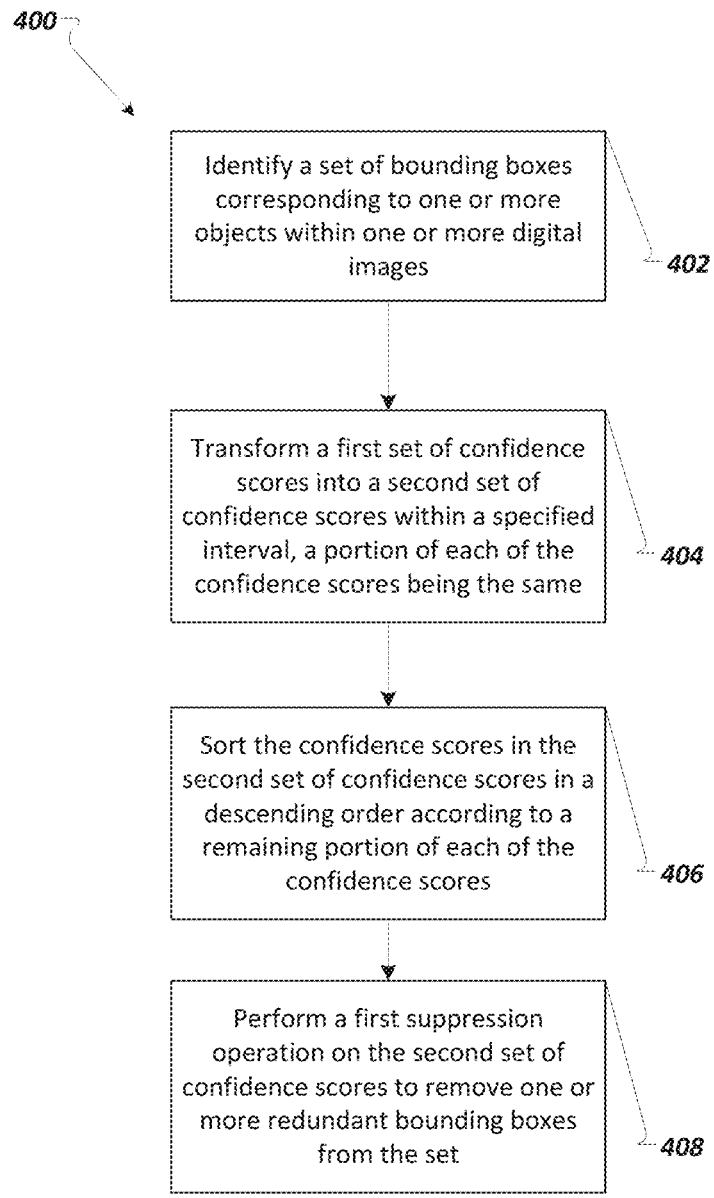
FIG. 4 is a flow diagram of a method of performing bit-reduced sorting in NMS computations to remove one or more redundant bounding boxes, according to at least one embodiment.

FIG. 4 is a flow diagram of a method 400 of performing bit-reduced sorting in NMS computations to remove one or more redundant bounding boxes, according to at least one embodiment. Method 400 can be performed by processing logic comprising hardware, software, firmware, or any combination thereof. In at least one embodiment, method 400 is performed by inference and/or training logic 115. In at least one embodiment, method 400 is performed as part of a neural network, such as layer 704 in neural network 700 of FIG. 7A. Details regarding inference and/or training logic 115 are provided herein in conjunction with FIGS. 1A and/or 1B. In at least one embodiment, inference and/or training logic 115 may be used in system FIG. 8 for inferencing or predicting operations based, at least in part, on weight parameters calculated using neural network training operations, neural network functions and/or architectures, or neural network use cases described herein.

Referring back to FIG. 4, method 400 begins by processing logic identifying a set of bounding boxes corresponding to one or more objects associated with one or more digital images (block 402). Each of the set of bounding boxes is associated with a confidence score in a first set of confidence scores. The processing logic can transform the first set of confidence scores into a second set of confidence scores within a specified interval (block 404), such as between one and two but not including two. Transforming the first set of confidence scores into the second set of confidence scores within the specified interval results in a first portion of each confidence score in the second set of confidence scores to be the same. The processing logic can sort the confidence scores in the second set of confidence scores in a descending order according to a remaining portion of each confidence score in the second set of confidence scores (block 406). The processing logic can further perform a first suppression operation on the second set of confidence scores to remove one or more redundant bounding boxes from the set of bounding boxes (block 408).

In another embodiment, the second set of confidence scores is part of a first class and the processing logic can identify a second set of bounding boxes corresponding to one or more objects in a second class. Each of the second set of bounding boxes is associated with a confidence score in a third set of confidence scores. The processing logic can transform the third set of confidence scores into a fourth set of confidence scores within the specified interval. A first portion of each confidence score in the fourth set of confidence scores is the same. The processing logic can sort the confidence scores of the fourth set of confidence scores in a descending order according to a remaining portion of each confidence score in the fourth set of confidence scores. The processing logic can perform a second suppression operation on the fourth set of confidence scores in the descending order to remove one or more redundant bounding boxes from the second set of bounding boxes. The processing logic can repeat this for C number of classes detected by the object detection model. Once completed, the processing logic can sort all of the remaining bounding boxes in a descending order to further reduce the number of bounding boxes for the one or more images.

As described above, the processing logic can transforms the first set of confidence scores into the second set of confidence scores within the specified interval. For example, confidence scores in the first set can be floating-point numbers in the interval [0, 1]. As described herein, according to the IEEE 754 floating-point format (FP16 or FP32 are examples), or other floating-point formats, the floating-point numbers can be represented by a sign bit, a biased-exponent field, and a mantissa field (also referred to as a fractional part). For a normal floating-point number, it has an implicit 1 in it and is represented by $1.b_1b_2b_3 \ldots \times 2^e$. Numbers in [0, 1] can have the sign bit but different exponents. Let the vector s denote the confidence score values that will be sorted. An argsort function can be performed, rather than a sort function because the indices can be used to find the corresponding bounding boxes associated with each confidence score. It can be easily proved in mathematics that:

$$\mathrm{argsort}(s) = \mathrm{argsort}(\lambda s + c),$$

where $\lambda$ can be any positive number, c can be any real number, such that the transformed value ($\lambda s + c$) is in some interval [a, b].

Adding 1 to each element in the vector s does not change their order. By adding 1, the interval becomes [1, 2]. In order to make all numbers have the same exponent number, the number 2 at the end of the interval can be clipped to be a value that is less than 2 based on a number of mantissa bits in the mantissa fields (e.g., $2-2^{-m}$, where m is the number of mantissa bits). For a FP16 number, m is 10, so after the clip, the interval becomes $[1, 2-2^{-10}]$. For ease of description, the specified interval after being clipped is represented with the following annotation: [1, 2), wherein the half-open interval implies that the number 2 is excluded in this interval and the actual maximum number in this range depends on the floating-point format (FP32, FP16, etc.). After clipping the specified interval, an argsort function can be performed for a list of numbers whose values are all in [1, 2). All numbers now have the same exponent number (1) and the only portion that is different is the mantissa bits. Thus, the argsort can be done on only the mantissa bits for each of the floating-point numbers in the list after the transformation. As such, the transformation of the first set of confidence scores into the second set of confidence scores within the specified interval results in a first portion of each confidence score in the second set of confidence scores to be the same and the second set of confidence scores can be sorted using only a remaining portion of each confidence score.

In another embodiment, the argsort can be done with a limited number of most significant bits, called n, of the m number of mantissa bits. The possible values of n can be any number that satisfies the following condition:

$$1 <= n <= m$$

The limited number can correspond to a specified number of bounding boxes having the highest confidence scores in the second set of confidence scores. In at least one embodiment, the radix sort can be parameterized with the number of bits that will be considered for the sort.

In at least one embodiment, a NMS algorithm can identify a set of bounding boxes corresponding to one or more objects associated with one or more digital images. Each of the bounding boxes is associated with a confidence score. The NMS algorithm can transform the confidence scores into a specified interval such that at least a portion of the confidence scores are the same. The NMS algorithm can sort the confidence scores according to a remaining port of the confidence scores that are not the same. As described herein, the NMS algorithm can perform a bit-reduced radix sort operation on the transformed scores. After sorting, the NMS algorithm can perform a suppression operation on the sorted scores to remove one or more redundant bounding boxes from the set of bounding boxes.

In at least one embodiment, the NMS algorithm can place the highest confidence score into an output list. The NMS algorithm can calculate an IoU value for at least one confidence score with respect to the confidence score in the output list. The NMS algorithm can determine whether the IoU value satisfies a threshold IoU. The NMS algorithm can identify the confidence score corresponding to a redundant bounding box to be removed responsive to determining that the IoU value satisfies the threshold IoU. The NMS algorithm identifies the confidence score corresponding to a non-redundant bounding box to be placed in the output list responsive to determining that the IoU value does not satisfy the threshold IoU. In at least one embodiment, the transformed confidence score comprises a first portion, such as a sign bit, a second portion, such as an exponent field of bits, and a third portion, such as a mantissa field of bits. After transformation, the transformed confidence scores can have the same first portion and the same second portion. The NMS algorithm can sort the transformed confidence scores using only the third portion.

In at least one embodiment, the processing logic sorts the confidence scores by comparing one or more most significant bits of a third portion of each of the confidence scores. In another embodiment, the processing logic sorts the confidence scores according to one or more most significant bits of the third portion. As described herein, the confidence scores can be sorted per class at a first instance and sorted again per image at a second instance. In at least one embodiment, the processing logic places the bounding box with the highest confidence score into an output list and calculates an IoU value for the bounding box in the output list and a next bounding box. The processing logic can determine whether the IoU value satisfies a threshold IoU. The next bounding box can be identified as a redundant bounding box to be removed responsive to determining the IoU value satisfies the threshold IoU. The next bounding box can be identified a non-redundant bounding box to be added to the output list responsive to determining the IoU value does not satisfy the threshold IoU.

Figure 5:
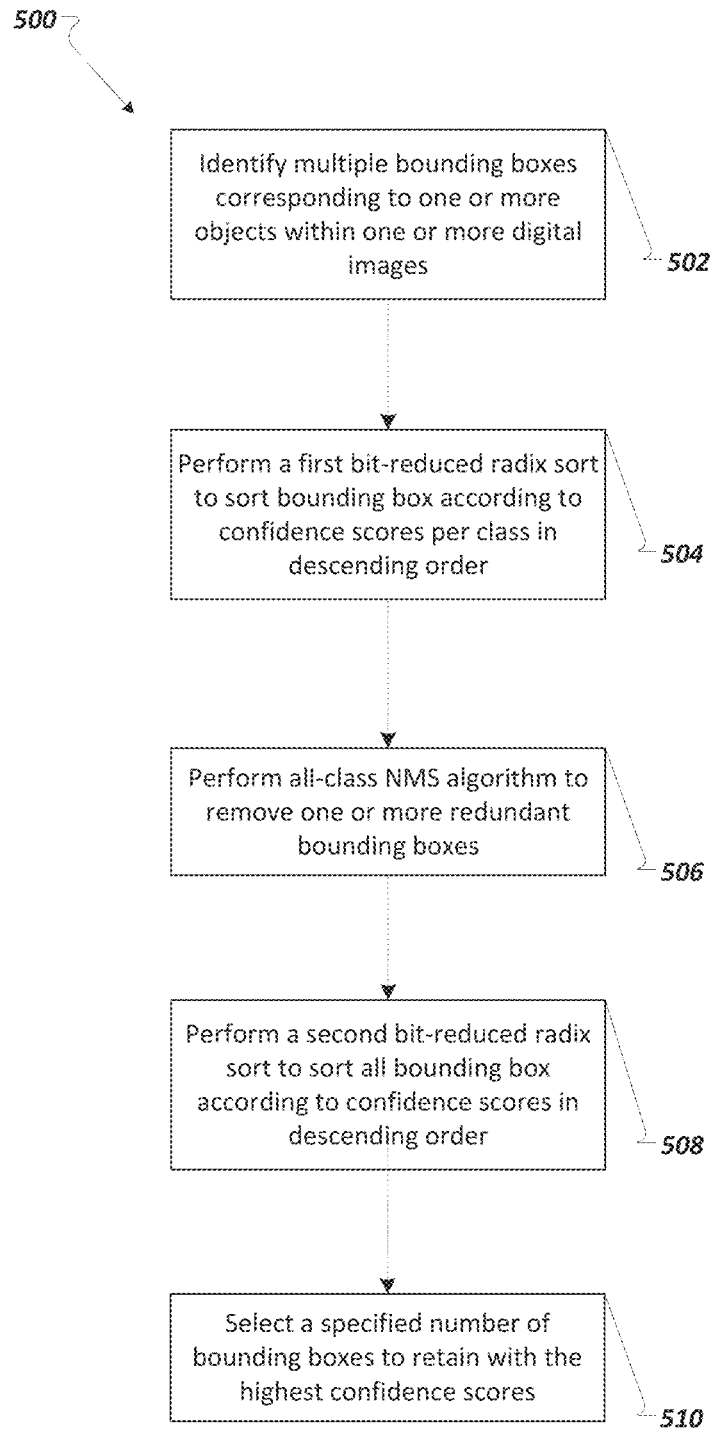
FIG. 5 is a flow diagram of a method of performing an NMS algorithm with bit-reduced sorting operations to remove one or more redundant bounding boxes, according to at least one embodiment.

FIG. 5 is a flow diagram of a method 500 of performing an NMS algorithm with bit-reduced sorting operations to remove one or more redundant bounding boxes, according to at least one embodiment. Method 500 can be performed by processing logic comprising hardware, software, firmware, or any combination thereof. In at least one embodiment, method 500 is performed by inference and/or training logic 115. In at least one embodiment, method 500 is performed as part of a neural network, such as layer 704 in neural network 700 of FIG. 7A. Details regarding inference and/or training logic 115 are provided herein in conjunction with FIGS. 1A and/or 1B. In at least one embodiment, inference and/or training logic 115 may be used in system FIG. 10B for inferencing or predicting operations based, at least in part, on weight parameters calculated using neural network training operations, neural network functions and/or architectures, or neural network use cases described herein.

Referring back to FIG. 5, method 500 begins by processing logic identifying multiple bounding boxes corresponding to one or more objects within one or more digital images (block 502). The processing logic can perform a first bit-reduced radix sort to sort bounding boxes according to confidence scores per class in a descending order (block 504). The bit-reduced radix sort can be similar to the operations described above with respect to FIG. 4. The processing logic can perform all-class NMS algorithm to remove one or more redundant bounding boxes (block 506). The processing logic can perform a second bit-reduced radix sort to sort all bounding boxes according to confidence scores in a descending order (block 508). The processing logic can select a specified number of bounding boxes to retain with the highest confidence scores (block 510).

In at least one embodiment, processing logic is performed using one or more layers of a neural network. In at least one embodiment, a neural network includes multiple layers and an output layer. In at least one embodiment, multiple layers of a neural network obtain an output feature map with multiple redundant bounding boxes corresponding to one or more objects within one or more digital images at block 502 and an output layer performs NMS with bit-reduced sorting to remove one or more redundant bounding boxes at blocks 504-510. In at least one embodiment, an output layer identifies a set of bounding boxes corresponding to one or more objects within one or more digital images at block 502 and performs NMS with bit-reduced sorting to remove one or more redundant bounding boxes at blocks 504-510.

Figure 6:
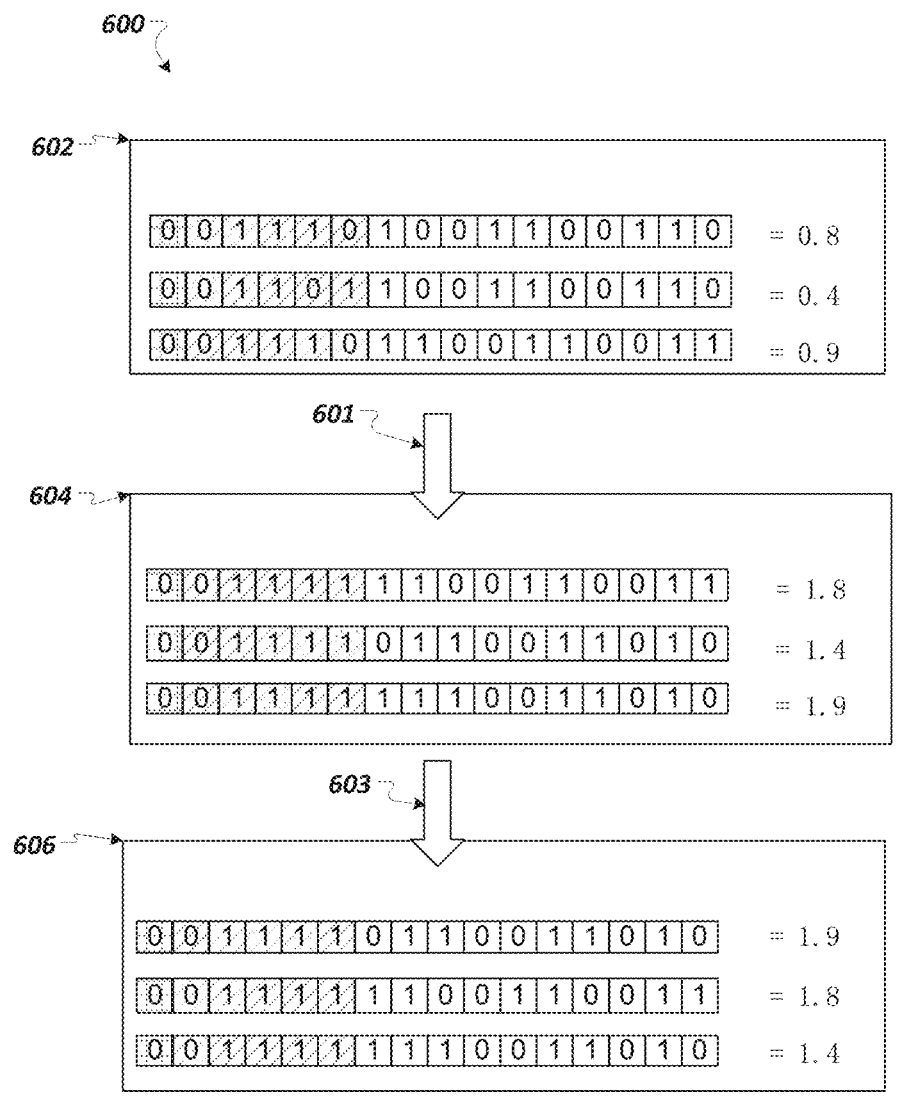
FIG. 6 illustrates an example transformation of a floating-point number for a bit-reduced sorting operation, according to at least one embodiment.

FIG. 6 illustrates an example transformation of a floating-point number for a bit-reduced sorting operation, according to at least one embodiment. A first set of confidence scores 602 includes three confidence scores: 0.8, 0.4, and 0.9. The first set of confidence scores 602 is transformed into a second set of confidence scores 604 by a transformation operation 601. The second set of confidence scores 604 includes three transformed confidence scores: 1.8, 1.4, and 1.9. As illustrated, each of the second set of confidence scores 604 has a portion of the number that is the same. The second set of confidence scores 604 can be sorted by a bit-reduced sorting operation 603 using a remaining portion of each of the second set of confidence scores to obtain a sorted set of confidence scores 606. The sorted set of confidence scores 606 includes three confidence scores in descending order: 1.9, 1.8, and 1.4.

Figure 7A:
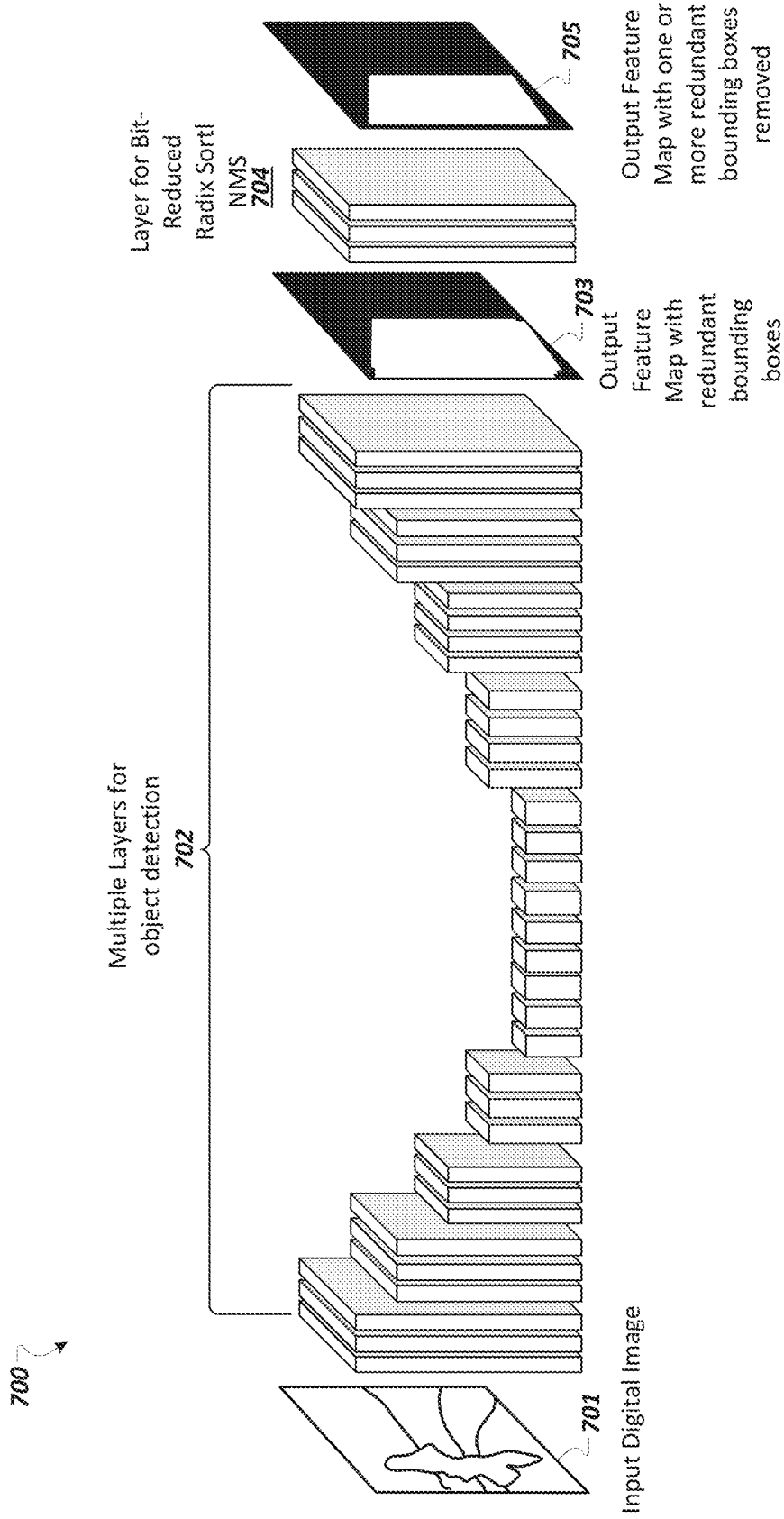
FIG. 7A illustrates a visual representation of a neural network with multiple layers for object detection and a layer for NMS with bit-reduced sorting, according to at least one embodiment.

FIG. 7A illustrates a visual representation of a neural network 700 with multiple layers 702 for object detection and a layer 704 for NMS with bit-reduced sorting, according to at least one embodiment. In at least one embodiment, neural network 700 is performed by inference and/or training logic 115. Details regarding inference and/or training logic 115 are provided herein in conjunction with FIGS. 1A and/or 1B. In at least one embodiment, inference and/or training logic 115 may be used in system FIG. 8 for inferencing or predicting operations based, at least in part, on weight parameters calculated using neural network training operations, neural network functions and/or architectures, or neural network use cases described herein.

In at least one embodiment, neural network 700 obtains an input digital image 701 and multiple layers 702 process input digital image 701, outputting an output feature map 703. The output feature map 703 identifies multiple bounding boxes corresponding to an object detected in input digital image 701. In at least one embodiment, output feature map 703 includes a confidence output header that identifies multiple bounding boxes. In at least one embodiment, output feature map 703 includes a confidence output header and a bounding box regression header. In at least one embodiment, multiple layers 702 of neural network 700 are part of a deep neural network (DNN) pipeline that provides output feature map 703 with multiple bounding boxes. The layer 704 processes output feature map 703 to remove one or more redundant bounding boxes and provides a revised output feature map 705. In at least one embodiment, the layer 704 uses a bit-reduced radix sort as described herein to sort the bounding boxes in a descending order of confidence scores. In at least one embodiment, output feature map 705 includes a confidence output header and a bounding box regression header. In at least one embodiment, a confidence output header includes a heatmap of input digital image 701 in which point values are high if they belong to an object. In at least one embodiment, output feature map 703 has a smaller resolution compared with input digital image 701. For example, in at least one embodiment where an input image is 800×600, output feature map 703 can be 200×150 with a stride of four.

In at least one embodiment, in order to obtain a full bounding box, in addition to a confidence output header, a bounding box regression header can be employed to work along with a confidence output header. In at least one embodiment, four values can be used to describe a bounding box and a location of a bounding box. For example, where a confidence output header is 200×150, a bounding box regression header can be 200×150×4 to be able to define a center point (x, y) and a box size (w, h), where x and y are coordinates of a center point and w and h are width and height of a bounding box. A bounding box regression header can be defined using other representations, such as left, top, right, and bottom corners or edges of a bounding box (e.g., x1, y1, x2, y2). A confidence output header can include a confidence score for multiple points from which candidate points can be determined and a bounding box regression header includes a bounding box description for each bounding box corresponding to one or more objects detected by multiple layers 702 within input digital image 701.

Figure 7B:
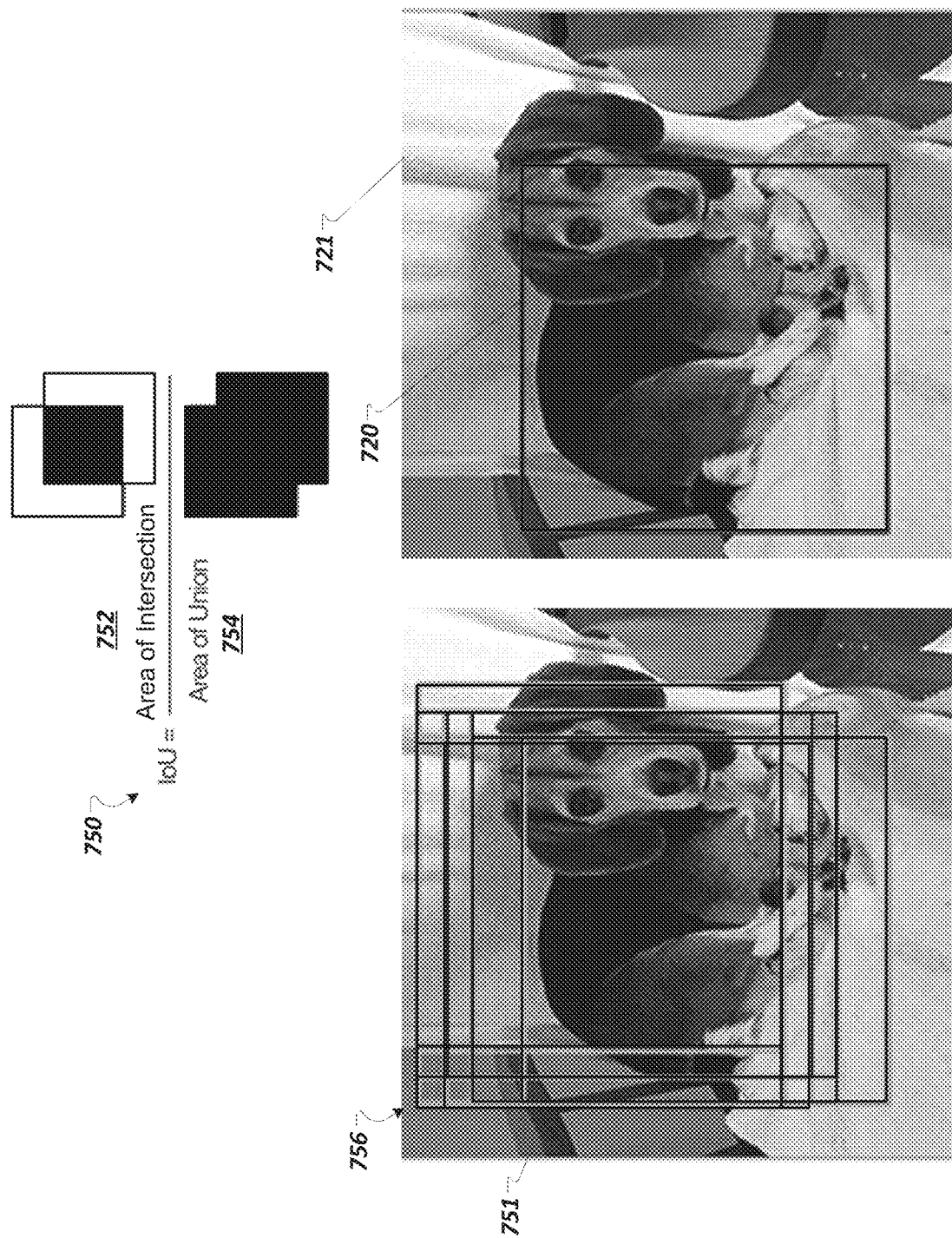
FIG. 7B illustrates a bounding box suppression operation, according to at least one embodiment.

In at least one embodiment, output feature map 703 includes redundant bounding boxes, such as illustrated in digital image 751 of FIG. 7B, and layer 704 can perform NMS with bit-reduced sorting to remove one or more redundant bounding boxes to obtain an output feature map 705, such as illustrated in image 721 of FIG. 7B.

FIG. 7B illustrates a bounding box suppression operation, according to at least one embodiment. In at least one embodiment, digital image 751 includes multiple bounding boxes 756 of an object (e.g., a dog) before NMS with bit-reduced sorting is performed. In at least one embodiment, digital image 721 includes a single bounding box 720 of an object after NMS with bit-reduced sorting is performed.

Referring back to FIG. 7A, in at least one embodiment, layer 704 can perform other clustering algorithms to suppress one or more redundant bounding boxes to obtain output feature map 705. The layer 704 can define a list of candidate bounding boxes by setting a confidence threshold, T, for a confidence output header. A confidence threshold T can be used to filter out bounding boxes with confidence values less than confidence threshold, T (e.g., cov<T). For example, bounding boxes with confidence values greater than confidence threshold T (e.g., cov>T) can be identified. As a result, in at least one embodiment, bounding boxes with appropriate confidence values can be stored in a list of bounding boxes, such as [bbox1, bbox2, bbox3 . . . bboxM], where M represents a positive integer representing a total number of bounding boxes contained in output feature map 703.

In at least one embodiment, one ground truth (GT) box can belong to several bounding boxes and several bounding boxes may need clustering to remove any redundant bounding box. In at least one embodiment, a degree of overlap between two bounding boxes can be used for clustering bounding boxes. A degree of overlap can be determined using an IoU value between two boxes by computing an area of overlap (also referred to as intersection) divided by an area of union, such as illustrated by equation 750 in FIG. 7B. In at least one embodiment, an IoU value is produced by equation 750 as area of overlap 752 of two bounding boxes divided by an area of union 754 of these two bounding boxes.

Referring back to FIG. 7A, in at least one embodiment, layer 704 can implement a NMS with bit-reduced sorting algorithm in one or more circuits in series or parallel to remove redundant bounding boxes for an object detection pipeline, such as multiple layers 702 of neural network 700. In at least one embodiment, an objective of clustering is that for one object a most confident bounding box should be identified and all redundant bounding boxes should be removed. Embodiments of NMS with bit-reduced sorting as described herein can be compatible with NMS optimizations, like confidence aggregation. Embodiments of NMS with bit-reduced sorting as described herein can be implemented as one or more layers (e.g., an output layer) of an Object Detection DNN pipeline and can be run on one or more GPUs without data switching between GPUs and a CPU.

In at least one embodiment, a NMS with bit-reduced sorting algorithm is applied to a single confidence header feature map. In at least one embodiment, a NMS with bit-reduced sorting algorithm is applied to multiple confidence header feature maps. In at least one embodiment, an object detection pipeline can have multiple output feature maps and a NMS with bit-reduced sorting algorithm can perform clustering for each feature map and then perform NMS on all bounding boxes. In at least one embodiment, an object detection pipeline can have multiple output feature maps and candidate points can be mapped from low-resolution feature maps to high-resolution feature maps and then a NMS with bit-reduced sorting algorithm can be performed on a largest feature map.

In at least one embodiment, a NMS with bit-reduced sorting algorithm can be extended to multiple anchor boxes for each point. In at least one embodiment, anchor boxes are a set of predefined bounding boxes of a certain height and width and a neural network can return a set of predictions for every anchor box defined. In at least one embodiment, a NMS with bit-reduced sorting algorithm identifies a set of candidate boxes with a set of candidate points from an output feature map, where each point corresponds to at least a first anchor box with a first confidence score and a second anchor box with a second confidence score. In at least one embodiment, each box of a set of candidate boxes includes at least one of a first confidence score that is greater than a first confidence threshold or a second confidence score that is greater than a second confidence threshold.

Data Center

Figure 8:
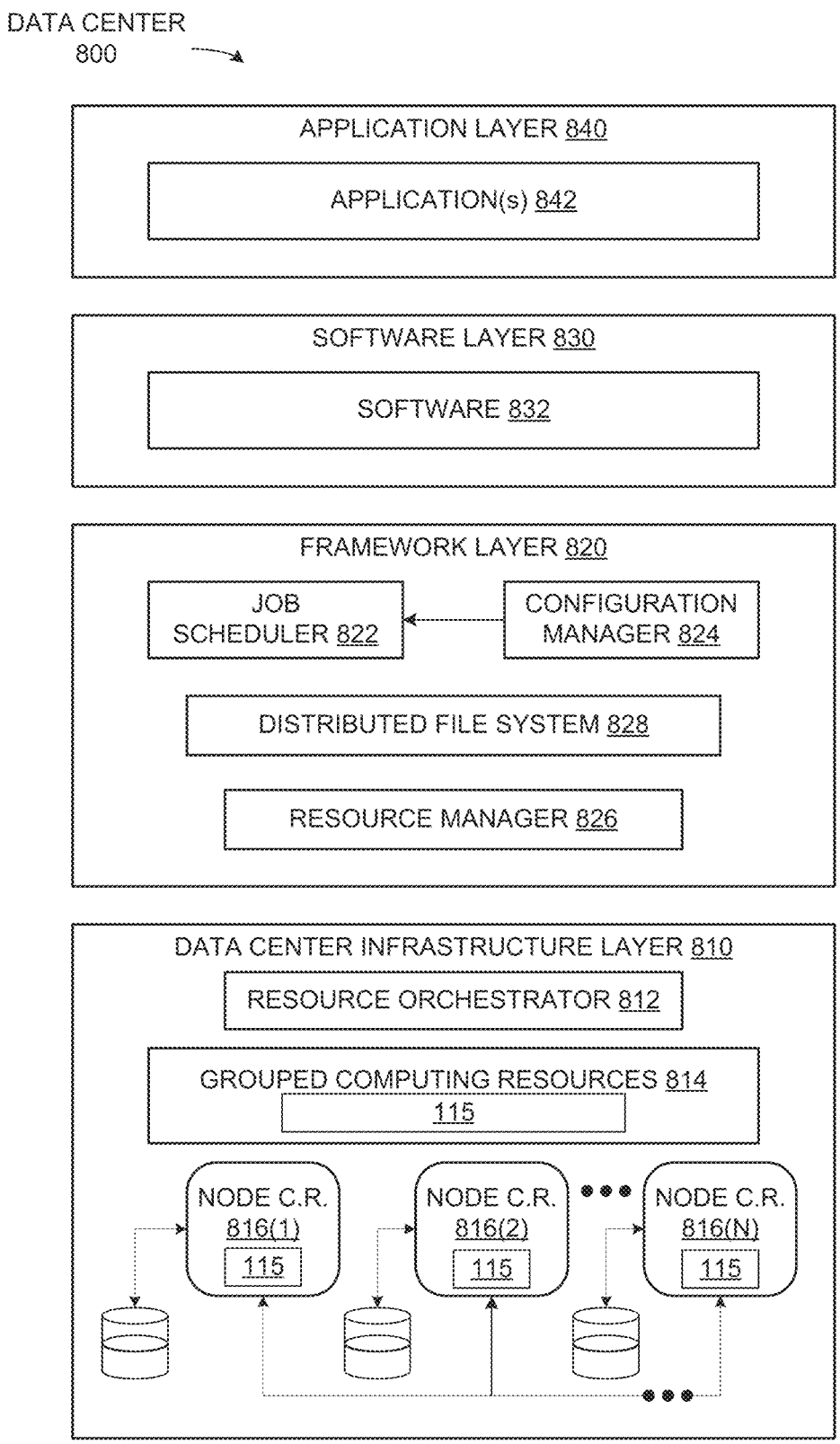
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 115 are used to perform inferencing and/or training operations associated with one or more embodiments. Details regarding inference and/or training logic 115 are provided below in conjunction with FIGS. 1A and/or 1B. In at least one embodiment, inference and/or training logic 115 may be used in system FIG. 8 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Computer Systems

Figure 9:
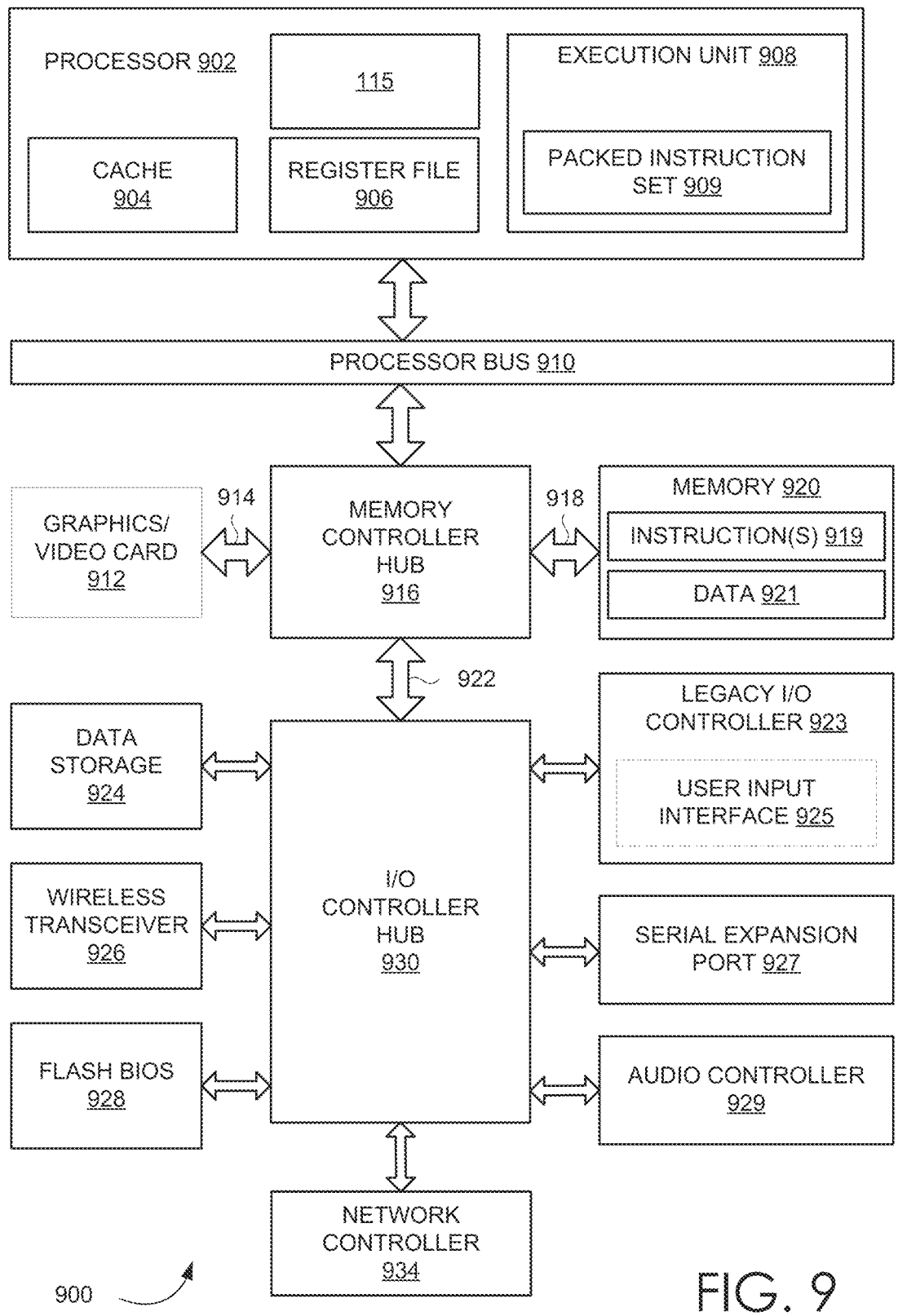
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating-point registers, status registers, and instruction pointer register.

In at least one embodiment, execution unit 908, including, without limitation, logic to perform integer and floating-point operations, also resides in processor 902. In at least one embodiment, processor 902 may also include a micro-code ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 115 are used to perform inferencing and/or training operations associated with one or more embodiments. Details regarding inference and/or training logic 115 are provided below in conjunction with FIGS. 1A and/or 1B. In at least one embodiment, inference and/or training logic 115 may be used in system FIG. 9 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 10:
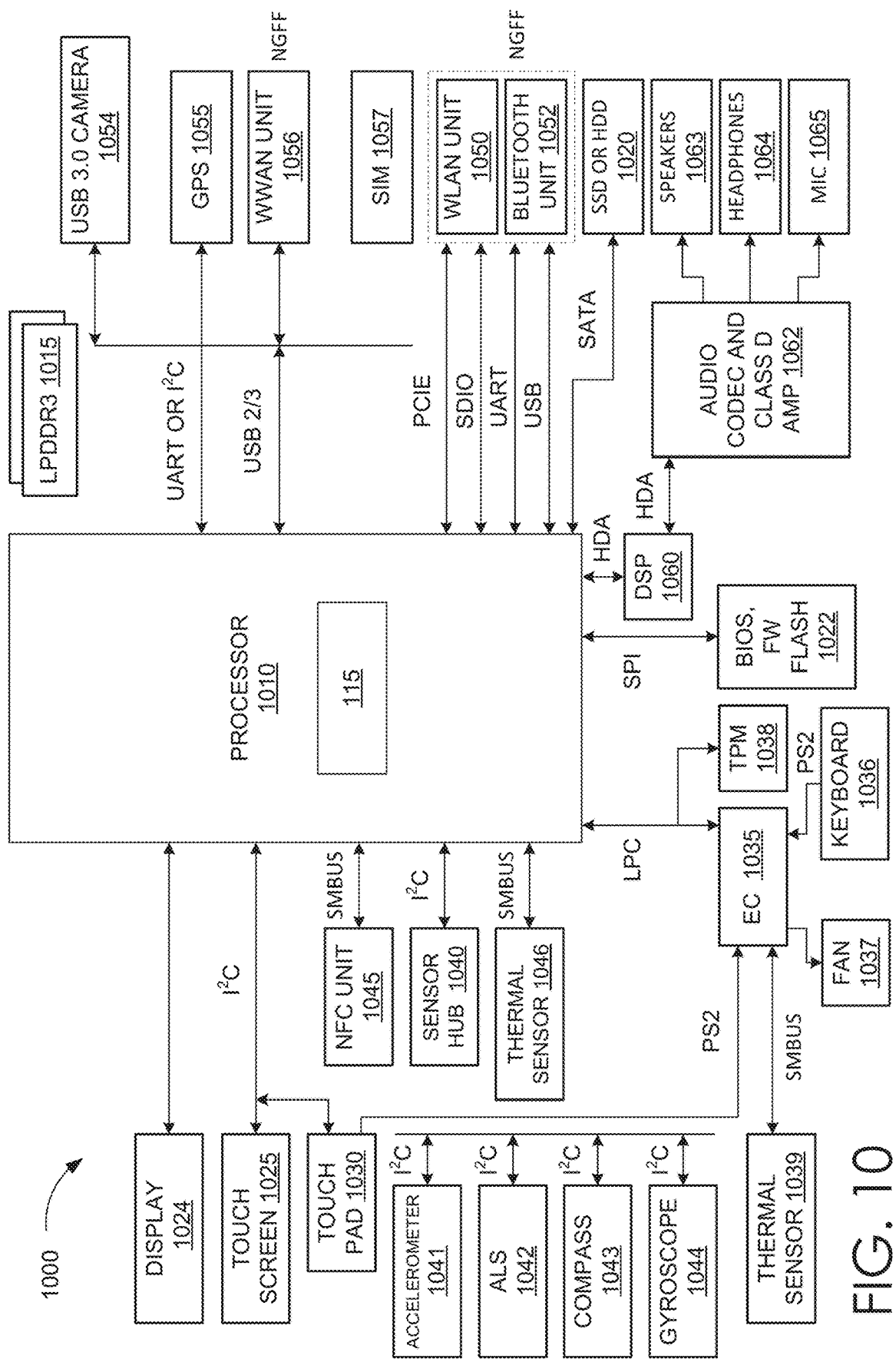
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, device 1000 may include, without limitation, processor 1010 communicatively coupled to any suitable number or kind of components, peripherals, modules, or devices. In at least one embodiment, processor 1010 coupled using a bus or interface, such as a I2C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NEC") 1045, a sensor hub 1040, a thermal sensor 1046, an Express Chipset ("EC") 1035, a Trusted Platform Module ("TPM") 1038, BIOS/firmware/ flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit may include, for example and without limitation, an audio coder/ decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 115 are used to perform inferencing and/or training operations associated with one or more embodiments. Details regarding inference and/or training logic 115 are provided below in conjunction with FIGS. 1A and/or 1B. In at least one embodiment, inference and/or training logic 115 may be used in system FIG. 10 for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 11:
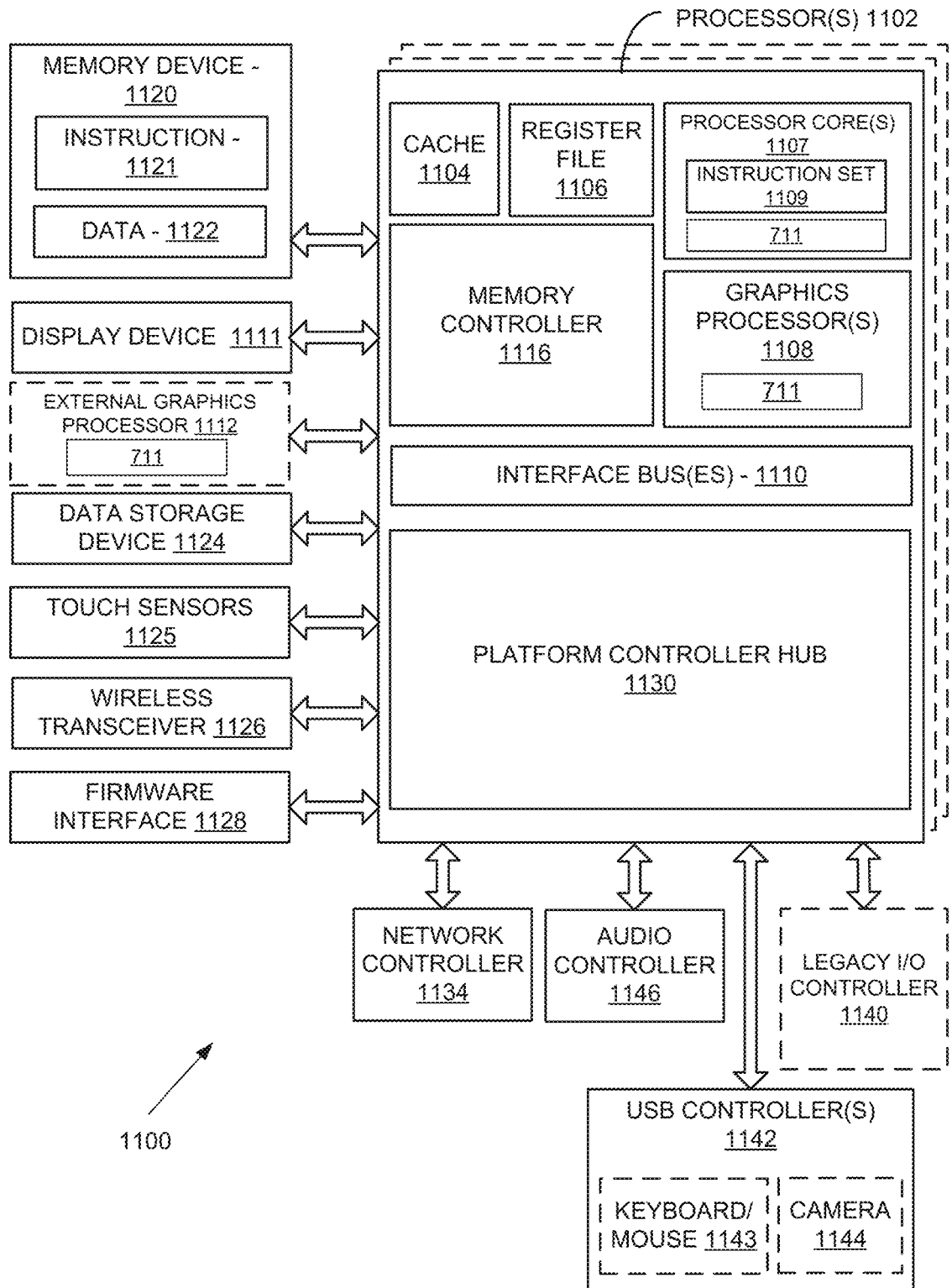
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating-point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 115 are used to perform inferencing and/or training operations associated with one or more embodiments. Details regarding inference and/or training logic 115 are provided below in conjunction with FIGS. 1A and/or 1B. In at least one embodiment portions or all of inference and/or training logic 115 may be incorporated into graphics processor 1108. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 1A or 1B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate synthetic data imitating failure cases in a network training process, which can help to improve performance of the network while limiting the amount of synthetic data to avoid overfitting.

Figure 12:
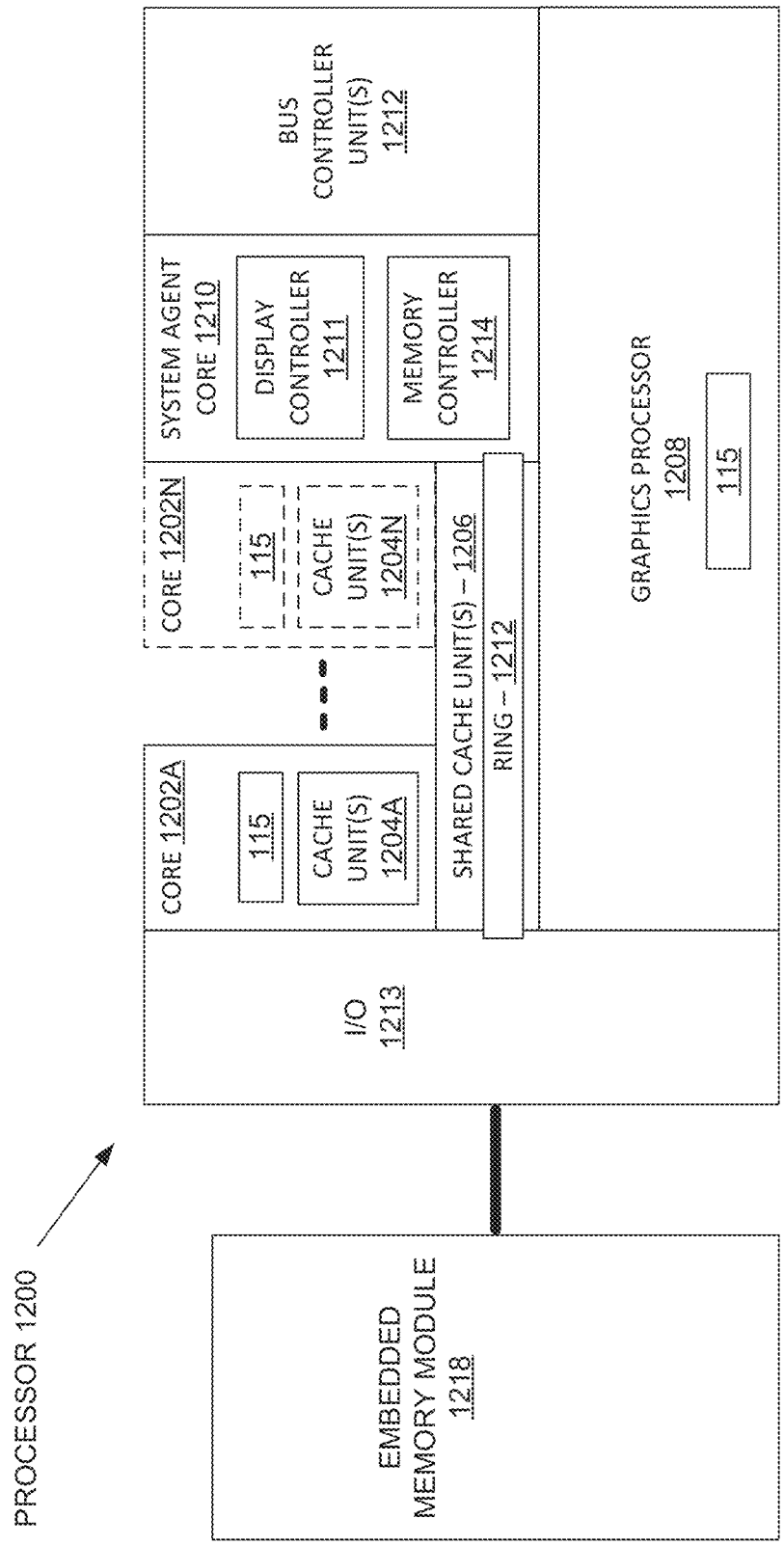
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 115 are used to perform inferencing and/or training operations associated with one or more embodiments. Details regarding inference and/or training logic 115 are provided below in conjunction with FIGS. 1A and/or 1B. In at least one embodiment portions or all of inference and/or training logic 115 may be incorporated into processor 1200. For example, in at least one embodiment, training and/or inferencing techniques described herein may use one or more of ALUs embodied in graphics processor 1212, graphics core(s) 1202A-1202N, or other components in FIG. 12. Moreover, in at least one embodiment, inferencing and/or training operations described herein may be done using logic other than logic illustrated in FIG. 1A or 1B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to generate synthetic data imitating failure cases in a network training process, which can help to improve performance of the network while limiting the amount of synthetic data to avoid overfitting.

Virtualized Computing Platform

Figure 13:
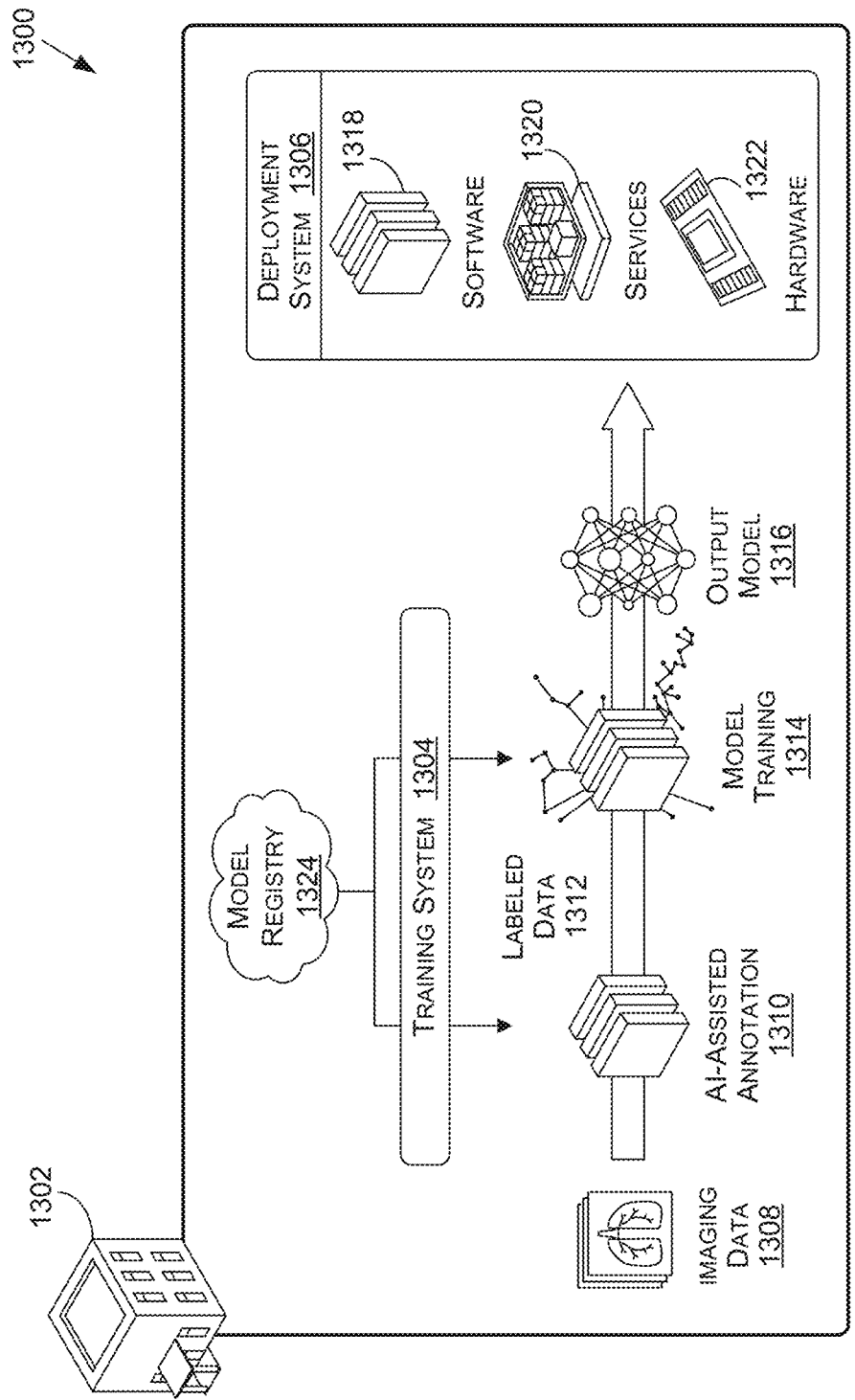
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
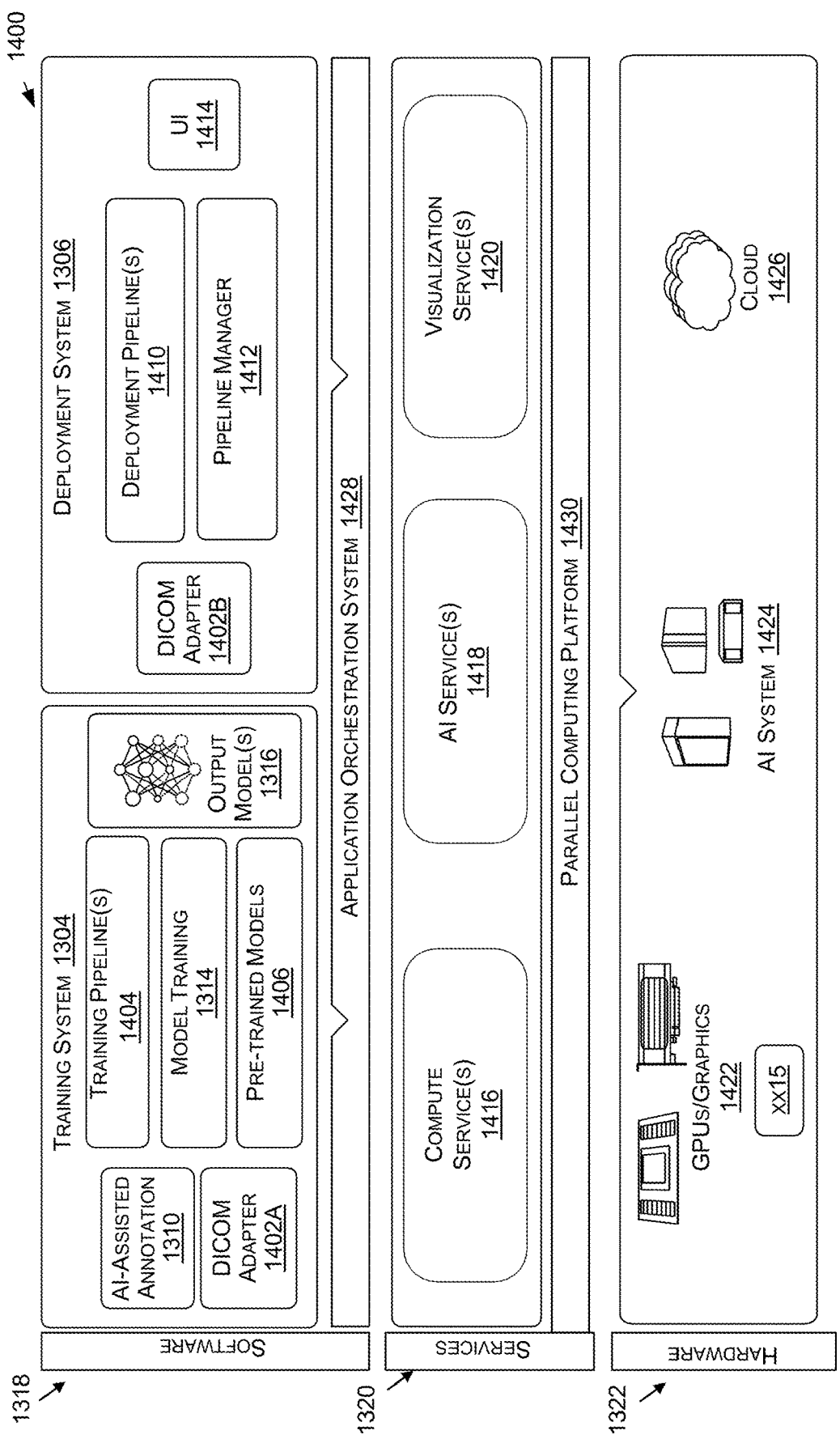
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
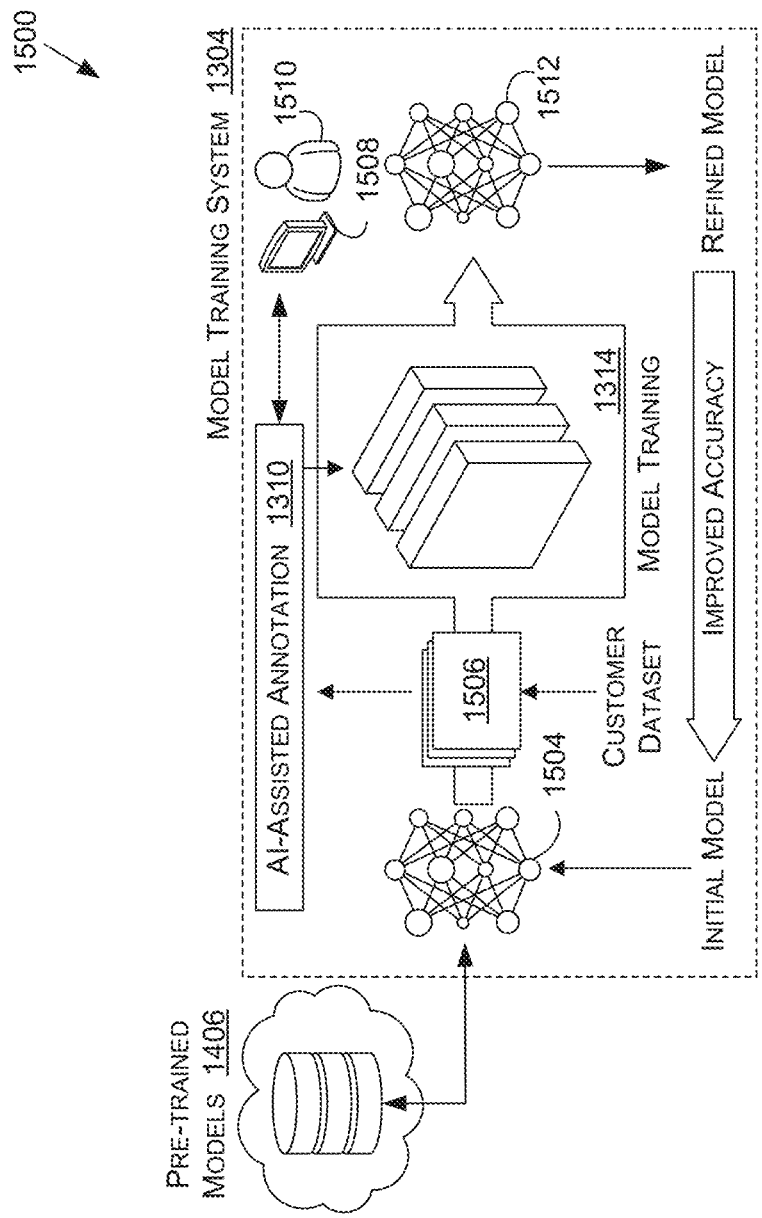
FIGS. 15A and 15B illustrate a data flow diagram for a process to train a machine learning model, as well as client-server architecture to enhance annotation tools with pre-trained annotation models, in accordance with at least one embodiment.
Figure 15B:
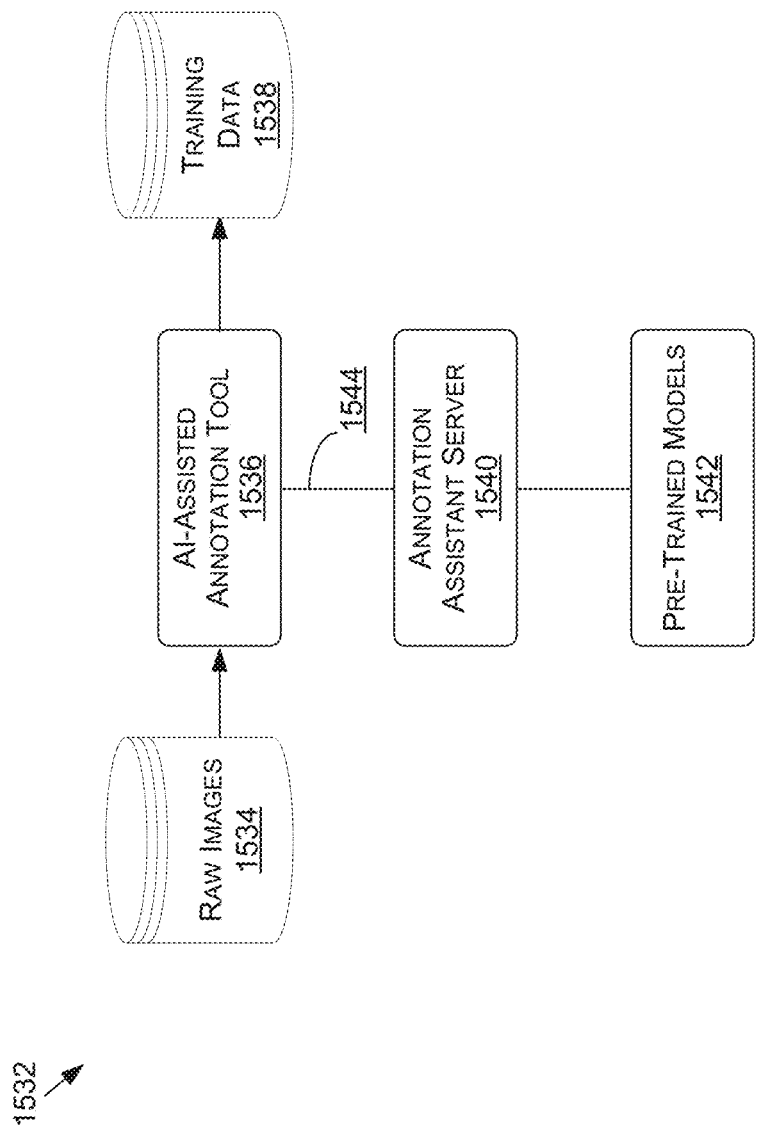

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an MRI machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12*cc*) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to generate synthetic data imitating failure cases in a network training process, which can help to improve performance of the network while limiting the amount of synthetic data to avoid overfitting.

Autonomous Vehicle

Figure 16A:
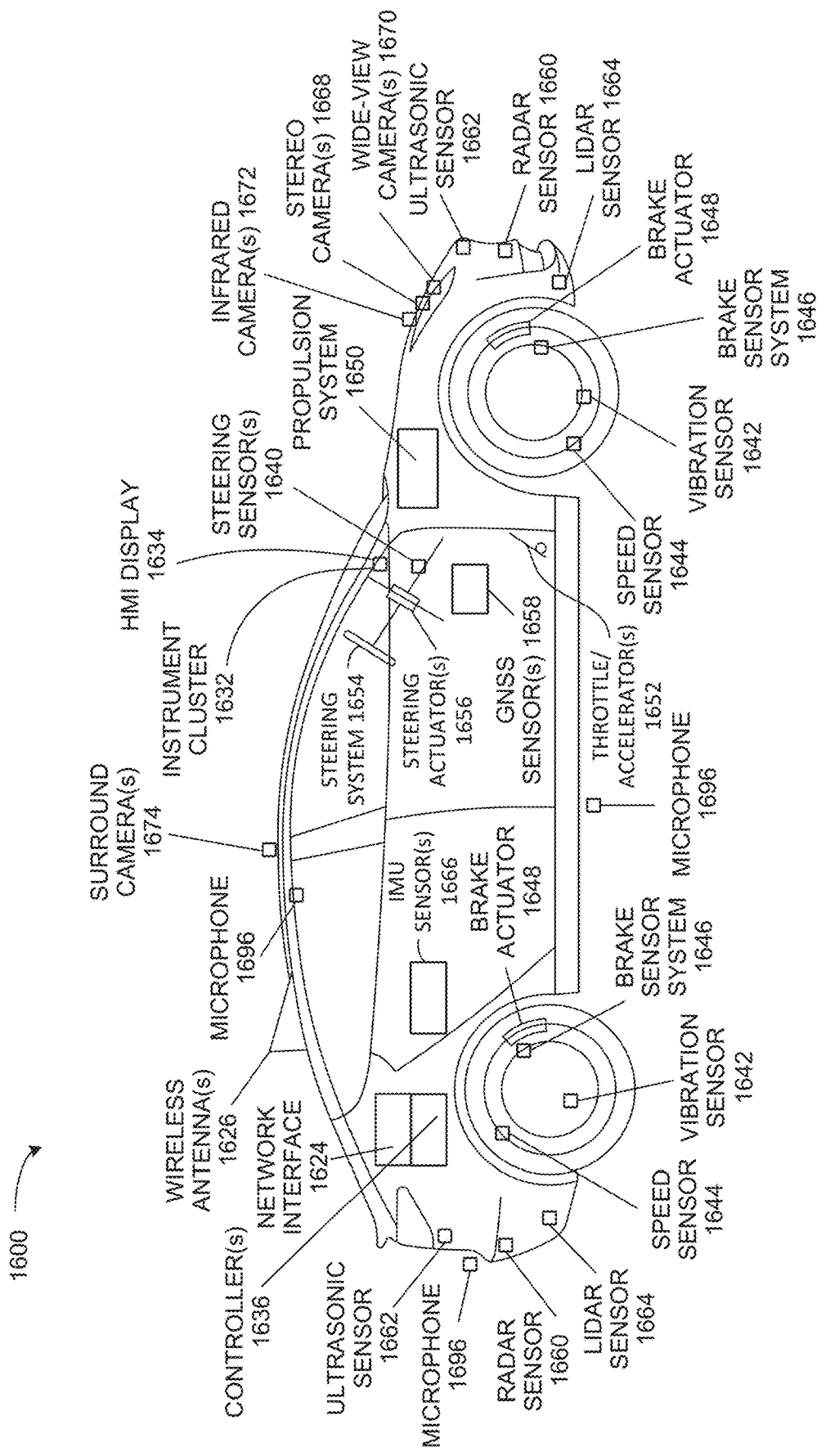
FIG. 16A illustrates an example of an autonomous vehicle, according to at least one embodiment.

FIG. 16A illustrates an example of an autonomous vehicle 1600, according to at least one embodiment. In at least one embodiment, autonomous vehicle 1600 (alternatively referred to herein as "vehicle 1600") may be, without limitation, a passenger vehicle, such as a car, a truck, a bus, and/or another type of vehicle that accommodates one or more passengers. In at least one embodiment, vehicle 1600 may be a semi-tractor-trailer truck used for hauling cargo. In at least one embodiment, vehicle 1600 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles"

(e.g., Standard No. J3016-201806, published on Jun. 15, 2018, Standard No. J3016-201609, published on Sep. 30, 2016, and previous and future versions of this standard). In one or more embodiments, vehicle 1600 may be capable of functionality in accordance with one or more of level 1-level 5 of autonomous driving levels. For example, in at least one embodiment, vehicle 1600 may be capable of conditional automation (Level 3), high automation (Level 4), and/or full automation (Level 5), depending on embodiment.

In at least one embodiment, vehicle 1600 may include, without limitation, components such as a chassis, a vehicle body, wheels (e.g., 2, 4, 6, 8, 18, etc.), tires, axles, and other components of a vehicle. In at least one embodiment, vehicle 1600 may include, without limitation, a propulsion system 1650, such as an internal combustion engine, hybrid electric power plant, an all-electric engine, and/or another propulsion system type. In at least one embodiment, propulsion system 1650 may be connected to a drive train of vehicle 1600, which may include, without limitation, a transmission, to enable propulsion of vehicle 1600. In at least one embodiment, propulsion system 1650 may be controlled in response to receiving signals from a throttle/accelerator(s) 1652.

In at least one embodiment, a steering system 1654, which may include, without limitation, a steering wheel, is used to steer a vehicle 1600 (e.g., along a desired path or route) when a propulsion system 1650 is operating (e.g., when vehicle is in motion). In at least one embodiment, a steering system 1654 may receive signals from steering actuator(s) 1656. A steering wheel may be optional for full automation (Level 5) functionality. In at least one embodiment, a brake sensor system 1646 may be used to operate vehicle brakes in response to receiving signals from brake actuator(s) 1648 and/or brake sensors.

In at least one embodiment, controller(s) 1636, which may include, without limitation, one or more system on chips ("SoCs") (not shown in FIG. 16A) and/or graphics processing unit(s) ("GPU(s)"), provide signals (e.g., representative of commands) to one or more components and/or systems of vehicle 1600. For instance, in at least one embodiment, controller(s) 1636 may send signals to operate vehicle brakes via brake actuator(s) 1648, to operate steering system 1654 via steering actuator(s) 1656, and/or to operate propulsion system 1650 via throttle/accelerator(s) 1652. Controller(s) 1636 may include one or more onboard (e.g., integrated) computing devices (e.g., supercomputers) that process sensor signals, and output operation commands (e.g., signals representing commands) to enable autonomous driving and/or to assist a human driver in driving vehicle 1600. In at least one embodiment, controller(s) 1636 may include a first controller 1636 for autonomous driving functions, a second controller 1636 for functional safety functions, a third controller 1636 for artificial intelligence functionality (e.g., computer vision), a fourth controller 1636 for infotainment functionality, a fifth controller 1636 for redundancy in emergency conditions, and/or other controllers. In at least one embodiment, a single controller 1636 may handle two or more of above functionalities, two or more controllers 1636 may handle a single functionality, and/or any combination thereof.

In at least one embodiment, controller(s) 1636 provide signals for controlling one or more components and/or systems of vehicle 1600 in response to sensor data received from one or more sensors (e.g., sensor inputs). In at least one embodiment, sensor data may be received from, for example and without limitation, global navigation satellite systems ("GNSS") sensor(s) 1658 (e.g., Global Positioning System sensor(s)), RADAR sensor(s) 1660, ultrasonic sensor(s) 1662, LIDAR sensor(s) 1664, inertial measurement unit ("IMU") sensor(s) 1666 (e.g., accelerometer(s), gyroscope(s), magnetic compass(es), magnetometer(s), etc.), microphone(s) 1696, stereo camera(s) 1668, wide-view camera(s) 1670 (e.g., fisheye cameras), infrared camera(s) 1672, surround camera(s) 1674 (e.g., 360 degree cameras), long-range cameras (not shown in FIG. 16A), mid-range camera(s) (not shown in FIG. 16A), speed sensor(s) 1644 (e.g., for measuring speed of vehicle 1600), vibration sensor(s) 1642, steering sensor(s) 1640, brake sensor(s) (e.g., as part of brake sensor system 1646), and/or other sensor types.

In at least one embodiment, one or more of controller(s) 1636 may receive inputs (e.g., represented by input data) from an instrument cluster 1632 of vehicle 1600 and provide outputs (e.g., represented by output data, display data, etc.) via a human-machine interface ("HMI") display 1634, an audible annunciator, a loudspeaker, and/or via other components of vehicle 1600. In at least one embodiment, outputs may include information such as vehicle velocity, speed, time, map data (e.g., a High Definition map (not shown in FIG. 16A), location data (e.g., vehicle 1600's location, such as on a map), direction, location of other vehicles (e.g., an occupancy grid), information about objects and status of objects as perceived by controller(s) 1636, etc. For example, in at least one embodiment, HMI display 1634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1600 further includes a network interface 1624 which may use wireless antenna(s) 1626 and/or modem(s) to communicate over one or more networks. For example, in at least one embodiment, network interface 1624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1626 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 115 are used to perform inferencing and/or training operations associated with one or more embodiments. Details regarding inference and/or training logic 115 are provided below in conjunction with FIGS. 1A and/or 1B. In at least one embodiment, inference and/or training logic 115 may be used in system FIG. 16A for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 16B:
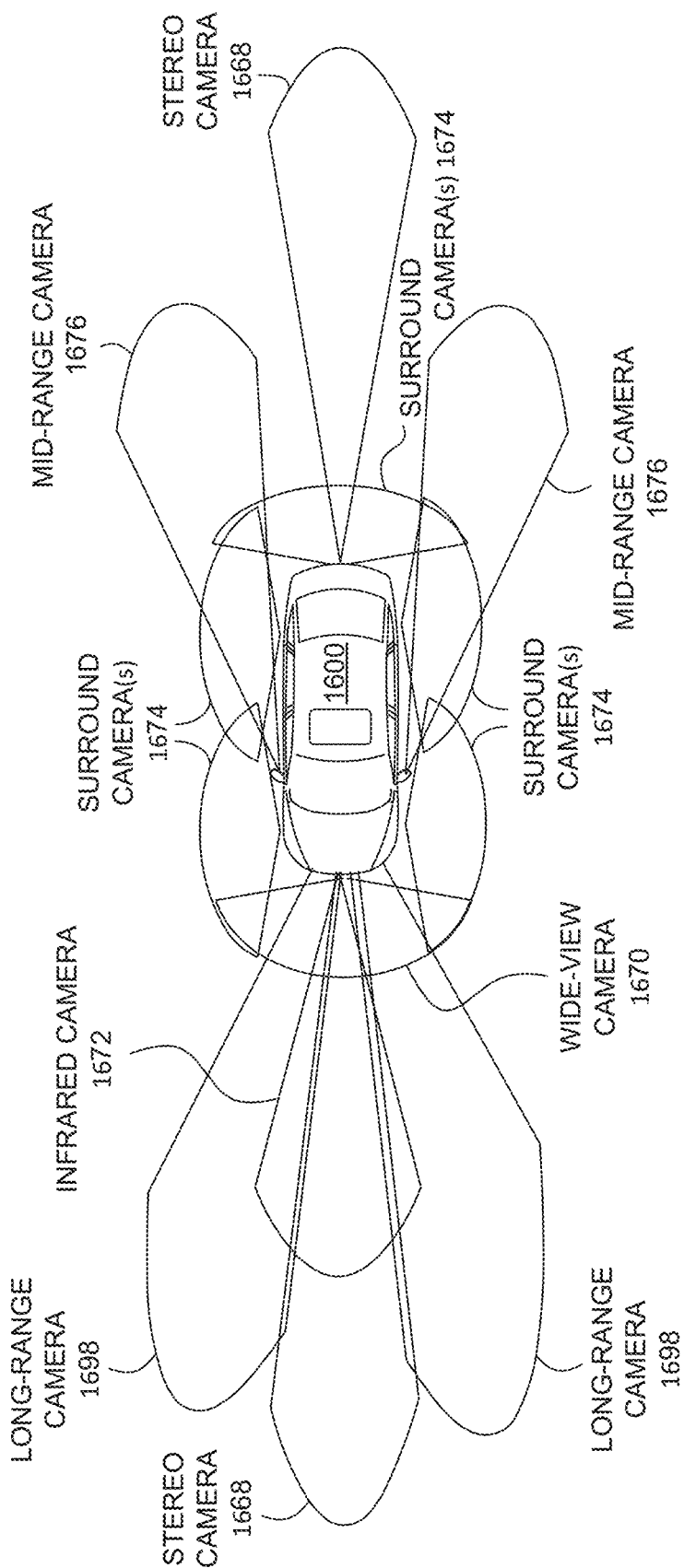
FIG. 16B illustrates an example of camera locations and fields of view for the autonomous vehicle of FIG. 16A, according to at least one embodiment.

FIG. 16B illustrates an example of camera locations and fields of view for autonomous vehicle 1600 of FIG. 16A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1600.

In at least one embodiment, camera types for cameras may include, but are not limited to, digital cameras that may be adapted for use with components and/or systems of vehicle 1600. In at least one embodiment, one or more of camera(s) may operate at automotive safety integrity level ("ASIL") B and/or at another ASIL. In at least one embodiment, camera types may be capable of any image capture rate, such as 60 frames per second (fps), 120 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner.

In at least one embodiment, cameras with a field of view that include portions of environment in front of vehicle 1600 (e.g., front-facing cameras) may be used for surround view, to help identify forward facing paths and obstacles, as well as aid in, with help of one or more of controllers 1636 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1670 may be used to perceive objects coming into view from periphery (e.g., pedestrians, crossing traffic or bicycles). Although only one wide-view camera 1670 is illustrated in FIG. 16B, in other embodiments, there may be any number (including zero) of wide-view camera(s) 1670 on vehicle 1600. In at least one embodiment, any number of long-range camera(s) 1698 (e.g., a long-view stereo camera pair) may be used for depth-based object detection, especially for objects for which a neural network has not yet been trained. In at least one embodiment, long-range camera(s) 1698 may also be used for object detection and classification, as well as basic object tracking.

In at least one embodiment, any number of stereo camera(s) 1668 may also be included in a front-facing configuration. In at least one embodiment, one or more of stereo camera(s) 1668 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1600, including a distance estimate for all points in image. In at least one embodiment, one or more of stereo camera(s) 1668 may include, without limitation, compact stereo vision sensor(s) that may include, without limitation, two camera lenses (one each on left and right) and an image processing chip that may measure distance from vehicle 1600 to target object and use generated information (e.g., metadata) to activate autonomous emergency braking and lane departure warning functions. In at least one embodiment, other types of stereo camera(s) 1668 may be used in addition to, or alternatively from, those described herein.

In at least one embodiment, cameras with a field of view that include portions of environment to side of vehicle 1600 (e.g., side-view cameras) may be used for surround view, providing information used to create and update occupancy grid, as well as to generate side impact collision warnings. For example, in at least one embodiment, surround camera(s) 1674 (e.g., four surround cameras 1674 as illustrated in FIG. 16B) could be positioned on vehicle 1600. In at least one embodiment, surround camera(s) 1674 may include, without limitation, any number and combination of wide-view camera(s) 1670, fisheye camera(s), 360 degree camera(s), and/or like. For instance, in at least one embodiment, four fisheye cameras may be positioned on front, rear, and sides of vehicle 1600. In at least one embodiment, vehicle 1600 may use three surround camera(s) 1674 (e.g., left, right, and rear), and may leverage one or more other camera(s) (e.g., a forward-facing camera) as a fourth surround-view camera.

In at least one embodiment, cameras with a field of view that include portions of environment to rear of vehicle 1600 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1698 and/or mid-range camera(s) 1676, stereo camera(s) 1668), infrared camera(s) 1672, etc.), as described herein.

Inference and/or training logic 115 are used to perform inferencing and/or training operations associated with one or more embodiments. Details regarding inference and/or training logic 115 are provided below. In at least one embodiment, inference and/or training logic 115 may be used in system FIG. 16B for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 16C:
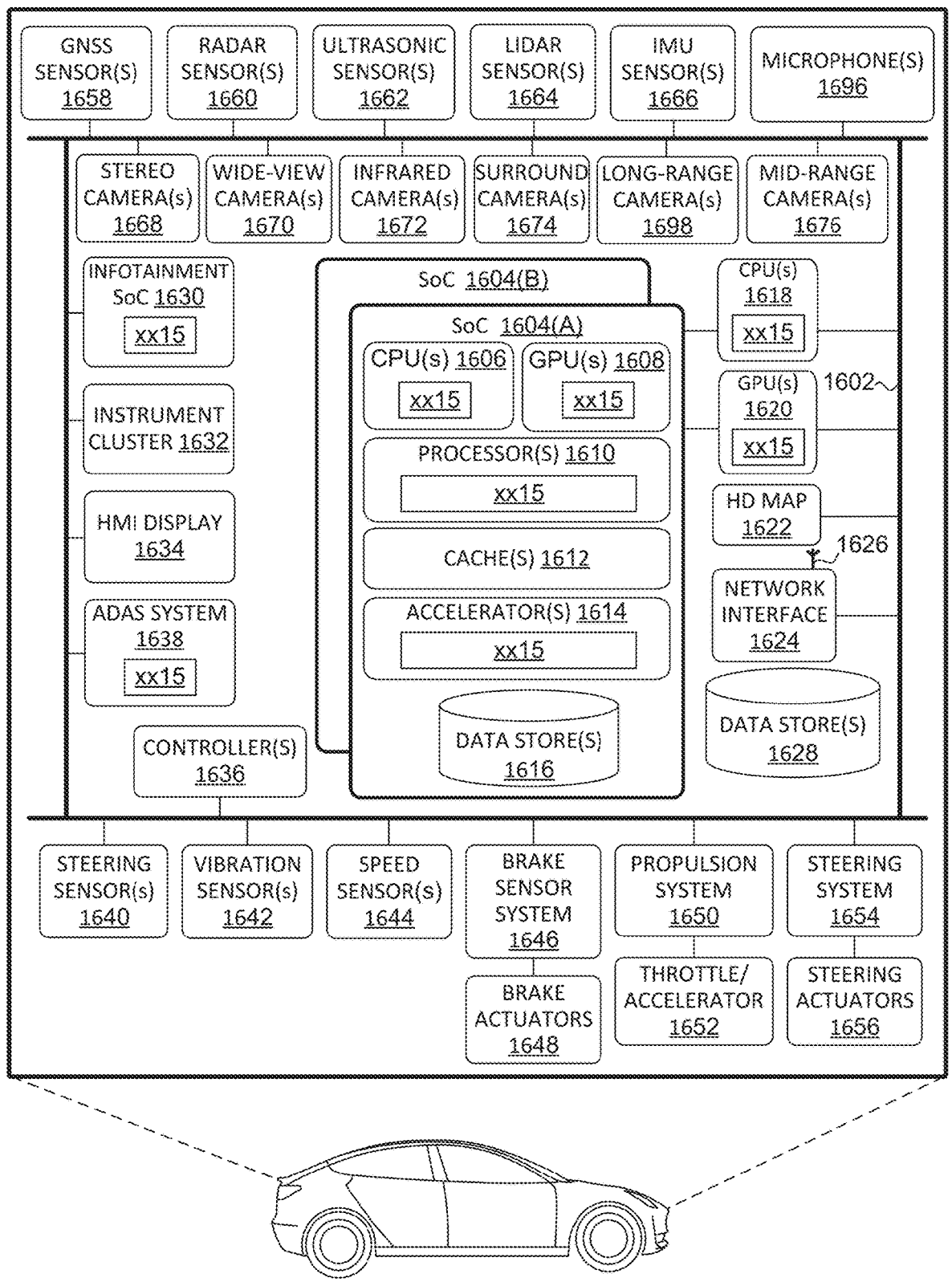
FIG. 16C illustrates an example system architecture for the autonomous vehicle of FIG. 16A, according to at least one embodiment.

FIG. 16C is a block diagram illustrating an example system architecture for autonomous vehicle 1600 of FIG. 16A, according to at least one embodiment. In at least one embodiment, each of components, features, and systems of vehicle 1600 in FIG. 16C are illustrated as being connected via a bus 1602. In at least one embodiment, bus 1602 may include, without limitation, a CAN data interface (alternatively referred to herein as a "CAN bus"). In at least one embodiment, a CAN bus may be a network inside vehicle 1600 used to aid in control of various features and functionality of vehicle 1600, such as actuation of brakes, acceleration, braking, steering, windshield wipers, etc. In at least one embodiment, bus 1602 may be configured to have dozens or even hundreds of nodes, each with its own unique identifier (e.g., a CAN ID). In at least one embodiment, bus 1602 may be read to find steering wheel angle, ground speed, engine revolutions per minute ("RPMs"), button positions, and/or other vehicle status indicators. In at least one embodiment, bus 1602 may be a CAN bus that is ASIL B compliant.

In at least one embodiment, in addition to, or alternatively from CAN, FlexRay and/or Ethernet may be used. In at least one embodiment, there may be any number of busses 1602, which may include, without limitation, zero or more CAN busses, zero or more FlexRay busses, zero or more Ethernet busses, and/or zero or more other types of busses using a different protocol. In at least one embodiment, two or more busses 1602 may be used to perform different functions, and/or may be used for redundancy. For example, a first bus 1602 may be used for collision avoidance functionality and a second bus 1602 may be used for actuation control. In at least one embodiment, each bus 1602 may communicate with any of components of vehicle 1600, and two or more busses 1602 may communicate with same components. In at least one embodiment, each of any number of system(s) on chip(s) ("SoC(s)") 1604, each of controller(s) 1636, and/or each computer within vehicle may have access to same input data (e.g., inputs from sensors of vehicle 1600), and may be connected to a common bus, such CAN bus.

In at least one embodiment, vehicle 1600 may include one or more controller(s) 1636, such as those described herein with respect to FIG. 16A. Controller(s) 1636 may be used for a variety of functions. In at least one embodiment, controller(s) 1636 may be coupled to any of various other components and systems of vehicle 1600, and may be used for control of vehicle 1600, artificial intelligence of vehicle 1600, infotainment for vehicle 1600, and/or like.

In at least one embodiment, vehicle 1600 may include any number of SoCs 1604. Each of SoCs 1604 may include, without limitation, central processing units ("CPU(s)") 1606, graphics processing units ("GPU(s)") 1608, processor(s) 1610, cache(s) 1612, accelerator(s) 1614, data store(s) 1616, and/or other components and features not illustrated. In at least one embodiment, SoC(s) 1604 may be used to control vehicle 1600 in a variety of platforms and systems. For example, in at least one embodiment, SoC(s) 1604 may be combined in a system (e.g., system of vehicle 1600) with a High Definition ("HD") map 1622 which may obtain map refreshes and/or updates via network interface 1624 from one or more servers (not shown in FIG. 16C).

In at least one embodiment, CPU(s) 1606 may include a CPU cluster or CPU complex (alternatively referred to herein as a "CCPLEX"). In at least one embodiment, CPU(s) 1606 may include multiple cores and/or level two ("L2") caches. For instance, in at least one embodiment, CPU(s) 1606 may include eight cores in a coherent multi-processor configuration. In at least one embodiment, CPU(s) 1606 may include four dual-core clusters where each cluster has a dedicated L2 cache (e.g., a 2 MB L2 cache). In at least one embodiment, CPU(s) 1606 (e.g., CCPLEX) may be configured to support simultaneous cluster operation enabling any combination of clusters of CPU(s) 1606 to be active at any given time.

In at least one embodiment, one or more of CPU(s) 1606 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1606 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1608 may include an integrated GPU (alternatively referred to herein as an "iGPU"). In at least one embodiment, GPU(s) 1608 may be programmable and may be efficient for parallel workloads. In at least one embodiment, GPU(s) 1608, in at least one embodiment, may use an enhanced tensor instruction set. In at least one embodiment, GPU(s) 1608 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1608 may include at least eight streaming microprocessors. In at least one embodiment, GPU(s) 1608 may use compute application programming interface(s) (API(s)). In at least one embodiment, GPU(s) 1608 may use one or more parallel computing platforms and/or programming models (e.g., NVIDIA's CUDA).

In at least one embodiment, one or more of GPU(s) 1608 may be power-optimized for best performance in automotive and embedded use cases. For example, in on embodiment, GPU(s) 1608 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1608 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1608 may include unified memory technology. In at least one embodiment, address translation services ("ATS") support may be used to allow GPU(s) 1608 to access CPU(s) 1606 page tables directly. In at least one embodiment, embodiment, when GPU(s) 1608 memory management unit ("MMU") experiences a miss, an address translation request may be transmitted to CPU(s) 1606. In response, CPU(s) 1606 may look in its page tables for virtual-to-physical mapping for address and transmits translation back to GPU(s) 1608, in at least one embodiment. In at least one embodiment, unified memory technology may allow a single unified virtual address space for memory of both CPU(s) 1606 and GPU(s) 1608, thereby simplifying GPU(s) 1608 programming and porting of applications to GPU(s) 1608.

In at least one embodiment, GPU(s) 1608 may include any number of access counters that may keep track of frequency of access of GPU(s) 1608 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1604 may include any number of cache(s) 1612, including those described herein. For example, in at least one embodiment, cache(s) 1612 could include a level three ("L3") cache that is available to both CPU(s) 1606 and GPU(s) 1608 (e.g., that is connected both CPU(s) 1606 and GPU(s) 1608). In at least one embodiment, cache(s) 1612 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1604 may include one or more accelerator(s) 1614 (e.g., hardware accelerators, software accelerators, or a combination thereof). In at least one embodiment, SoC(s) 1604 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1608 and to off-load some of tasks of GPU(s) 1608 (e.g., to free up more cycles of GPU(s) 1608 for performing other tasks). In at least one embodiment, accelerator(s) 1614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1614 (e.g., hardware acceleration cluster) may include a deep learning accelerator(s) ("DLA(s)"). DLA(s) may include, without limitation, one or more Tensor processing units ("TPU(s)") that may be configured to provide an additional ten trillion operations per second for deep learning applications and inferencing. In at least one embodiment, TPU(s) may be accelerators configured to, and optimized for, performing image processing functions (e.g., for CNNs, RCNNs, etc.). DLA(s) may further be optimized for a specific set of neural network types and floating-point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1696; a CNN for facial recognition and vehicle owner identification using data from camera sensors; and/or a CNN for security and/or safety related events.

In at least one embodiment, DLA(s) may perform any function of GPU(s) 1608, and by using an inference accelerator, for example, a designer may target either DLA(s) or GPU(s) 1608 for any function. For example, in at least one embodiment, designer may focus processing of CNNs and floating-point operations on DLA(s) and leave other functions to GPU(s) 1608 and/or other accelerator(s) 1614.

In at least one embodiment, accelerator(s) 1614 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1638, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1606. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU may include a digital signal processor such as, for example, a single instruction, multiple data ("SWED"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1614 (e.g., hardware acceleration cluster) may include a computer vision network on-chip and static random-access memory ("SRAM"), for providing a high-bandwidth, low latency SRAM for accelerator(s) 1614. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1604 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1614 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1600, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, in at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1666 that correlates with vehicle 1600 orientation, distance, 3D location estimates of object obtained from neural network and/or other sensors (e.g., LIDAR sensor(s) 1664 or RADAR sensor(s) 1660), among others.

In at least one embodiment, one or more of SoC(s) 1604 may include data store(s) 1616 (e.g., memory). In at least one embodiment, data store(s) 1616 may be on-chip memory of SoC(s) 1604, which may store neural networks to be executed on GPU(s) 1608 and/or DLA. In at least one embodiment, data store(s) 1616 may be large enough in capacity to store multiple instances of neural networks for redundancy and safety. In at least one embodiment, data store(s) 1616 may comprise L2 or L3 cache(s).

In at least one embodiment, one or more of SoC(s) 1604 may include any number of processor(s) 1610 (e.g., embedded processors). In at least one embodiment, processor(s) 1610 may include a boot and power management processor that may be a dedicated processor and subsystem to handle boot power and management functions and related security enforcement. In at least one embodiment, boot and power management processor may be a part of SoC(s) 1604 boot sequence and may provide runtime power management services. In at least one embodiment, boot power and management processor may provide clock and voltage programming, assistance in system low power state transitions, management of SoC(s) 1604 thermals and temperature sensors, and/or management of SoC(s) 1604 power states. In at least one embodiment, each temperature sensor may be implemented as a ring-oscillator whose output frequency is proportional to temperature, and SoC(s) 1604 may use ring-oscillators to detect temperatures of CPU(s) 1606, GPU(s) 1608, and/or accelerator(s) 1614. In at least one embodiment, if temperatures are determined to exceed a threshold, then boot and power management processor may enter a temperature fault routine and put SoC(s) 1604 into a lower power state and/or put vehicle 1600 into a chauffeur to safe stop mode (e.g., bring vehicle 1600 to a safe stop).

In at least one embodiment, processor(s) 1610 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1610 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1610 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1610 may further include a real-time camera engine that may include, without limitation, a dedicated processor subsystem for handling real-time camera management. In at least one embodiment, processor(s) 1610 may further include a high-dynamic range signal processor that may include, without limitation, an image signal processor that is a hardware engine that is part of camera processing pipeline.

In at least one embodiment, processor(s) 1610 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1670, surround camera(s) 1674, and/or on in-cabin monitoring camera sensor(s). In at least one embodiment, in-cabin monitoring camera sensor(s) are preferably monitored by a neural network running on another instance of SoC(s) 1604, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1608 are not required to continuously render new surfaces. In at least one embodiment, when GPU(s) 1608 are powered on and active doing 3D rendering, video image compositor may be used to offload GPU(s) 1608 to improve performance and responsiveness.

In at least one embodiment, one or more of SoC(s) 1604 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1604 may further include an input/output controller(s) that may be controlled by software and may be used for receiving I/O signals that are uncommitted to a specific role.

In at least one embodiment, one or more of SoC(s) 1604 may further include a broad range of peripheral interfaces to enable communication with peripherals, audio encoders/decoders ("codecs"), power management, and/or other devices. SoC(s) 1604 may be used to process data from cameras (e.g., connected over Gigabit Multimedia Serial Link and Ethernet), sensors (e.g., LIDAR sensor(s) 1664, RADAR sensor(s) 1660, etc. that may be connected over Ethernet), data from bus 1602 (e.g., speed of vehicle 1600, steering wheel position, etc.), data from GNSS sensor(s) 1658 (e.g., connected over Ethernet or CAN bus), etc. In at least one embodiment, one or more of SoC(s) 1604 may further include dedicated high-performance mass storage controllers that may include their own DMA engines, and that may be used to free CPU(s) 1606 from routine data management tasks.

In at least one embodiment, SoC(s) 1604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1604 may be faster, more reliable, and even more energy-efficient and space-efficient than conventional systems. For example, in at least one embodiment, accelerator(s) 1614, when combined with CPU(s) 1606, GPU(s) 1608, and data store(s) 1616, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which are used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1620) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained) and a text "flashing lights indicate icy conditions" may be interpreted by a second deployed neural network, which informs vehicle's path planning software (preferably executing on CPU Complex) that when flashing lights are detected, icy conditions exist. In at least one embodiment, a flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1608.

In at least one embodiment, a CNN for facial recognition and vehicle owner identification may use data from camera sensors to identify presence of an authorized driver and/or owner of vehicle 1600. In at least one embodiment, an always on sensor processing engine may be used to unlock vehicle when owner approaches driver door and turn on lights, and, in security mode, to disable vehicle when owner leaves vehicle. In this way, SoC(s) 1604 provide for security against theft and/or carjacking.

In at least one embodiment, a CNN for emergency vehicle detection and identification may use data from microphones 1696 to detect and identify emergency vehicle sirens. In at least one embodiment, SoC(s) 1604 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1658. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1662, until emergency vehicle(s) passes.

In at least one embodiment, vehicle 1600 may include CPU(s) 1618 (e.g., discrete CPU(s), or dCPU(s)), that may be coupled to SoC(s) 1604 via a high-speed interconnect (e.g., PCIe). In at least one embodiment, CPU(s) 1618 may include an X86 processor, for example. CPU(s) 1618 may be used to perform any of a variety of functions, including arbitrating potentially inconsistent results between ADAS sensors and SoC(s) 1604, and/or monitoring status and health of controller(s) 1636 and/or an infotainment system on a chip ("infotainment SoC") 1630, for example.

In at least one embodiment, vehicle 1600 may include GPU(s) 1620 (e.g., discrete GPU(s), or dGPU(s)), that may be coupled to SoC(s) 1604 via a high-speed interconnect (e.g., NVIDIA's NVLINK). In at least one embodiment, GPU(s) 1620 may provide additional artificial intelligence functionality, such as by executing redundant and/or different neural networks, and may be used to train and/or update neural networks based at least in part on input (e.g., sensor data) from sensors of vehicle 1600.

In at least one embodiment, vehicle 1600 may further include network interface 1624 which may include, without limitation, wireless antenna(s) 1626 (e.g., one or more wireless antennas 1626 for different communication protocols, such as a cellular antenna, a Bluetooth antenna, etc.). In at least one embodiment, network interface 1624 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 160 and other vehicle and/or an indirect link may be established (e.g., across networks and over Internet). In at least one embodiment, direct links may be provided using a vehicle-to-vehicle communication link. vehicle-to-vehicle communication link may provide vehicle 1600 information about vehicles in proximity to vehicle 1600 (e.g., vehicles in front of, on side of, and/or behind vehicle 1600). In at least one embodiment, aforementioned functionality may be part of a cooperative adaptive cruise control functionality of vehicle 1600.

In at least one embodiment, network interface 1624 may include an SoC that provides modulation and demodulation functionality and enables controller(s) 1636 to communicate over wireless networks. In at least one embodiment, network interface 1624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1600 may further include data store(s) 1628 which may include, without limitation, off-chip (e.g., off SoC(s) 1604) storage. In at least one embodiment, data store(s) 1628 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1600 may further include GNSS sensor(s) 1658 (e.g., GPS and/or assisted GPS sensors), to assist in mapping, perception, occupancy grid generation, and/or path planning functions. In at least one embodiment, any number of GNSS sensor(s) 1658 may be used, including, for example and without limitation, a GPS using a USB connector with an Ethernet to Serial (e.g., RS-232) bridge.

In at least one embodiment, vehicle 1600 may further include RADAR sensor(s) 1660. RADAR sensor(s) 1660 may be used by vehicle 1600 for long-range vehicle detection, even in darkness and/or severe weather conditions. In at least one embodiment, RADAR functional safety levels may be ASIL B. RADAR sensor(s) 1660 may use CAN and/or bus 1602 (e.g., to transmit data generated by RADAR sensor(s) 1660) for control and to access object tracking data, with access to Ethernet to access raw data in some examples. In at least one embodiment, wide variety of RADAR sensor types may be used. For example, and without limitation, RADAR sensor(s) 1660 may be suitable for front, rear, and side RADAR use. In at least one embodiment, one or more of RADAR sensors(s) 1660 are Pulse Doppler RADAR sensor(s).

In at least one embodiment, RADAR sensor(s) 1660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1660 may help in distinguishing between static and moving objects, and may be used by ADAS system 1638 for emergency brake assist and forward collision warning. Sensors 1660(s) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle 1600's surroundings at higher speeds with minimal interference from traffic in adjacent lanes. In at least one embodiment, other two antennae may expand field of view, making it possible to quickly detect vehicles entering or leaving vehicle 1600's lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1660 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1638 for blind spot detection and/or lane change assist.

In at least one embodiment, vehicle 1600 may further include ultrasonic sensor(s) 1662. Ultrasonic sensor(s) 1662, which may be positioned at front, back, and/or sides of vehicle 1600, may be used for park assist and/or to create and update an occupancy grid. In at least one embodiment, a wide variety of ultrasonic sensor(s) 1662 may be used, and different ultrasonic sensor(s) 1662 may be used for different ranges of detection (e.g., 2.5 m, 4 m). In at least one embodiment, ultrasonic sensor(s) 1662 may operate at functional safety levels of ASIL B.

In at least one embodiment, vehicle 1600 may include LIDAR sensor(s) 1664. LIDAR sensor(s) 1664 may be used for object and pedestrian detection, emergency braking, collision avoidance, and/or other functions. In at least one embodiment, LIDAR sensor(s) 1664 may be functional safety level ASIL B. In at least one embodiment, vehicle 1600 may include multiple LIDAR sensors 1664 (e.g., two, four, six, etc.) that may use Ethernet (e.g., to provide data to a Gigabit Ethernet switch).

In at least one embodiment, LIDAR sensor(s) 1664 may be capable of providing a list of objects and their distances for a 360-degree field of view. In at least one embodiment, commercially available LIDAR sensor(s) 1664 may have an advertised range of approximately 100 m, with an accuracy of 2 cm-3 cm, and with support for a 100 Mbps Ethernet connection, for example. In at least one embodiment, one or more non-protruding LIDAR sensors 1664 may be used. In such an embodiment, LIDAR sensor(s) 1664 may be implemented as a small device that may be embedded into front, rear, sides, and/or corners of vehicle 1600. In at least one embodiment, LIDAR sensor(s) 1664, in such an embodiment, may provide up to a 120-degree horizontal and 35-degree vertical field-of-view, with a 200 m range even for low-reflectivity objects. In at least one embodiment, front-mounted LIDAR sensor(s) 1664 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1600 up to approximately 200 m. In at least one embodiment, a flash LIDAR unit includes, without limitation, a receptor, which records laser pulse transit time and reflected light on each pixel, which in turn corresponds to range from vehicle 1600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device(s) may use a 5 nanosecond class I (eye-safe) laser pulse per frame and may capture reflected laser light in form of 3D range point clouds and co-registered intensity data.

In at least one embodiment, vehicle may further include IMU sensor(s) 1666. In at least one embodiment, IMU sensor(s) 1666 may be located at a center of rear axle of vehicle 1600, in at least one embodiment. In at least one embodiment, IMU sensor(s) 1666 may include, for example and without limitation, accelerometer(s), magnetometer(s), gyroscope(s), magnetic compass(es), and/or other sensor types. In at least one embodiment, such as in six-axis applications, IMU sensor(s) 1666 may include, without limitation, accelerometers and gyroscopes. In at least one embodiment, such as in nine-axis applications, IMU sensor(s) 1666 may include, without limitation, accelerometers, gyroscopes, and magnetometers.

In at least one embodiment, IMU sensor(s) 1666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1666 may enable vehicle 1600 to estimate heading without requiring input from a magnetic sensor by directly observing and correlating changes in velocity from GPS to IMU sensor(s) 1666. In at least one embodiment, IMU sensor(s) 1666 and GNSS sensor(s) 1658 may be combined in a single integrated unit.

In at least one embodiment, vehicle 1600 may include microphone(s) 1696 placed in and/or around vehicle 1600. In at least one embodiment, microphone(s) 1696 may be used for emergency vehicle detection and identification, among other things.

In at least one embodiment, vehicle 1600 may further include any number of camera types, including stereo camera(s) 1668, wide-view camera(s) 1670, infrared camera(s) 1672, surround camera(s) 1674, long-range camera(s) 1698, mid-range camera(s) 1676, and/or other camera types. In at least one embodiment, cameras may be used to capture image data around an entire periphery of vehicle 1600. In at least one embodiment, types of cameras used depends on vehicle 1600. In at least one embodiment, any combination of camera types may be used to provide necessary coverage around vehicle 1600. In at least one embodiment, number of cameras may differ depending on embodiment. For example, in at least one embodiment, vehicle 1600 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 16A and FIG. 16B.

In at least one embodiment, vehicle 1600 may further include vibration sensor(s) 1642. In at least one embodiment, vibration sensor(s) 1642 may measure vibrations of components of vehicle 1600, such as axle(s). For example, in at least one embodiment, changes in vibrations may indicate a change in road surfaces. In at least one embodiment, when two or more vibration sensors 1642 are used, differences between vibrations may be used to determine friction or slippage of road surface (e.g., when difference in vibration is between a power-driven axle and a freely rotating axle).

In at least one embodiment, vehicle 1600 may include ADAS system 1638. ADAS system 1638 may include, without limitation, an SoC, in some examples. In at least one embodiment, ADAS system 1638 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1660, LIDAR sensor(s) 1664, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1600 and automatically adjust speed of vehicle 1600 to maintain a safe distance from vehicles ahead. In at least one embodiment, lateral ACC system performs distance keeping, and advises vehicle 1600 to change lanes when necessary. In at least one embodiment, lateral ACC is related to other ADAS applications such as LC and CW.

In at least one embodiment, CACC system uses information from other vehicles that may be received via network interface 1624 and/or wireless antenna(s) 1626 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1600), while I2V communication concept provides information about traffic further ahead. In at least one embodiment, CACC system may include either or both I2V and V2V information sources. In at least one embodiment, given information of vehicles ahead of vehicle 1600, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1660, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1660, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1600 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1600 if vehicle 1600 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1660, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1600 is backing up. In at least one embodiment, RCTW system includes AEB system to ensure that vehicle brakes are applied to avoid a crash. In at least one embodiment, RCTW system may use one or more rear-facing RADAR sensor(s) 1660, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1600 itself decides, in case of conflicting results, whether to heed result from a primary computer or a secondary computer (e.g., first controller 1636 or second controller 1636). For example, in at least one embodiment, ADAS system 1638 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1638 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1604.

In at least one embodiment, ADAS system 1638 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1638 may be fed into primary computer's perception block and/or primary computer's dynamic driving task block. For example, in at least one embodiment, if ADAS system 1638 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1600 may further include infotainment SoC 1630 (e.g., an in-vehicle infotainment system (IVI)). Although illustrated and described as an SoC, infotainment system 1630, in at least one embodiment, may not be an SoC, and may include, without limitation, two or more discrete components. In at least one embodiment, infotainment SoC 1630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1600. For example, infotainment SoC 1630 could include radios, disk players, navigation systems, video players, USB and Bluetooth connectivity, carputers, in-car entertainment, WiFi, steering wheel audio controls, hands free voice control, a heads-up display ("HUD"), HMI display 1634, a telematics device, a control panel (e.g., for controlling and/or interacting with various components, features, and/or systems), and/or other components. In at least one embodiment, infotainment SoC 1630 may further be used to provide information (e.g., visual and/or audible) to user(s) of vehicle, such as information from ADAS system 1638, autonomous driving information such as planned vehicle maneuvers, trajectories, surrounding environment information (e.g., intersection information, vehicle information, road information, etc.), and/or other information.

In at least one embodiment, infotainment SoC 1630 may include any amount and type of GPU functionality. In at least one embodiment, infotainment SoC 1630 may communicate over bus 1602 (e.g., CAN bus, Ethernet, etc.) with other devices, systems, and/or components of vehicle 1600. In at least one embodiment, infotainment SoC 1630 may be coupled to a supervisory MCU such that GPU of infotainment system may perform some self-driving functions in event that primary controller(s) 1636 (e.g., primary and/or backup computers of vehicle 1600) fail. In at least one embodiment, infotainment SoC 1630 may put vehicle 1600 into a chauffeur to safe stop mode, as described herein.

In at least one embodiment, vehicle 1600 may further include instrument cluster 1632 (e.g., a digital dash, an electronic instrument cluster, a digital instrument panel, etc.). In at least one embodiment, instrument cluster 1632 may include, without limitation, a controller and/or supercomputer (e.g., a discrete controller or supercomputer). In at least one embodiment, instrument cluster 1632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1630 and instrument cluster 1632. In at least one embodiment, instrument cluster 1632 may be included as part of infotainment SoC 1630, or vice versa.

Inference and/or training logic 115 are used to perform inferencing and/or training operations associated with one or more embodiments. Details regarding inference and/or training logic 115 are provided below. In at least one embodiment, inference and/or training logic 115 may be used in system FIG. 16C for inferencing or predicting operations based, at least in part, on weight parameters calculated using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 16D:
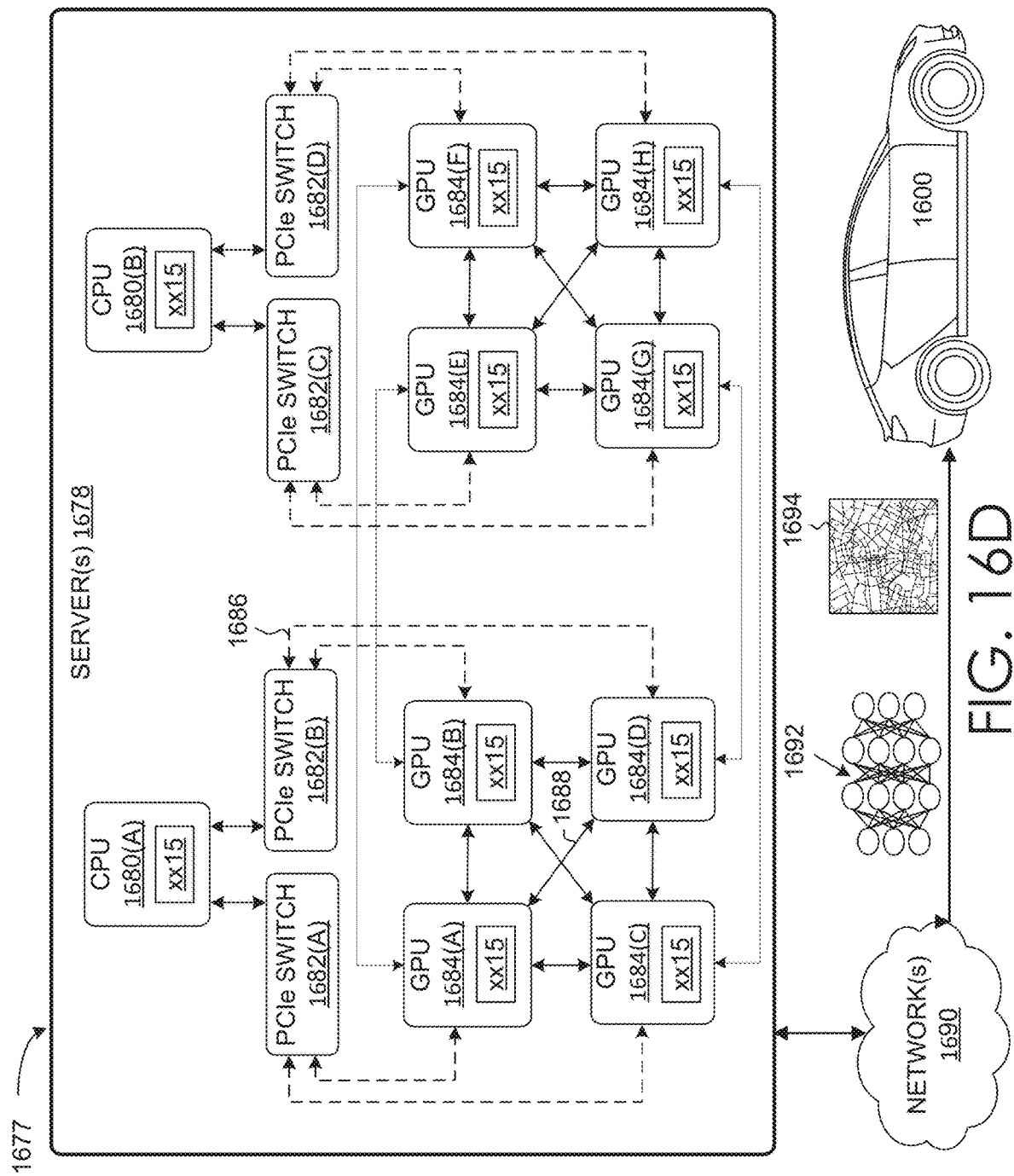
FIG. 16D illustrates a system for communication between cloud-based server(s) and the autonomous vehicle of FIG. 16A, according to at least one embodiment.

FIG. 16D is a diagram of a system 1677 for communication between cloud-based server(s) and autonomous vehicle 1600 of FIG. 16A, according to at least one embodiment. In at least one embodiment, system 1677 may include, without limitation, server(s) 1678, network(s) 1690, and any number and type of vehicles, including vehicle 1600. In at least one embodiment, server(s) 1678 may include, without limitation, a plurality of GPUs 1684(A)-1684(H) (collectively referred to herein as GPUs 1684), PCIe switches 1682(A)-1682(D) (collectively referred to herein as PCIe switches 1682), and/or CPUs 1680(A)-1680(B) (collectively referred to herein as CPUs 1680). GPUs 1684, CPUs 1680, and PCIe switches 1682 may be interconnected with high-speed interconnects such as, for example and without limitation, NVLink interfaces 1688 developed by NVIDIA and/or PCIe connections 1686. In at least one embodiment, GPUs 1684 are connected via an NVLink and/or NVSwitch SoC and GPUs 1684 and PCIe switches 1682 are connected via PCIe interconnects. In at least one embodiment, although eight GPUs 1684, two CPUs 1680, and four PCIe switches 1682 are illustrated, this is not intended to be limiting. In at least one embodiment, each of server(s) 1678 may include, without limitation, any number of GPUs 1684, CPUs 1680, and/or PCIe switches 1682, in any combination. For example, in at least one embodiment, server(s) 1678 could each include eight, sixteen, thirty-two, and/or more GPUs 1684.

In at least one embodiment, server(s) 1678 may receive, over network(s) 1690 and from vehicles, image data representative of images showing unexpected or changed road conditions, such as recently commenced road-work. In at least one embodiment, server(s) 1678 may transmit, over network(s) 1690 and to vehicles, neural networks 1692, updated neural networks 1692, and/or map information 1694, including, without limitation, information regarding traffic and road conditions. In at least one embodiment, updates to map information 1694 may include, without limitation, updates for HD map 1622, such as information regarding construction sites, potholes, detours, flooding, and/or other obstructions. In at least one embodiment, neural networks 1692, updated neural networks 1692, and/or map information 1694 may have resulted from new training and/or experiences represented in data received from any number of vehicles in environment, and/or based at least in part on training performed at a data center (e.g., using server(s) 1678 and/or other servers).

In at least one embodiment, server(s) 1678 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1690, and/or machine learning models may be used by server(s) 1678 to remotely monitor vehicles.

In at least one embodiment, server(s) 1678 may receive data from vehicles and apply data to up-to-date real-time neural networks for real-time intelligent inferencing. In at least one embodiment, server(s) 1678 may include deep-learning supercomputers and/or dedicated AI computers powered by GPU(s) 1684, such as a DGX and DGX Station machines developed by NVIDIA. However, in at least one embodiment, server(s) 1678 may include deep learning infrastructure that use CPU-powered data centers.

In at least one embodiment, deep-learning infrastructure of server(s) 1678 may be capable of fast, real-time inferencing, and may use that capability to evaluate and verify health of processors, software, and/or associated hardware in vehicle 1600. For example, in at least one embodiment, deep-learning infrastructure may receive periodic updates from vehicle 1600, such as a sequence of images and/or objects that vehicle 1600 has located in that sequence of images (e.g., via computer vision and/or other machine learning object classification techniques). In at least one embodiment, deep-learning infrastructure may run its own neural network to identify objects and compare them with objects identified by vehicle 1600 and, if results do not match and deep-learning infrastructure concludes that AI in vehicle 1600 is malfunctioning, then server(s) 1678 may transmit a signal to vehicle 1600 instructing a fail-safe computer of vehicle 1600 to assume control, notify passengers, and complete a safe parking maneuver.

In at least one embodiment, server(s) 1678 may include GPU(s) 1684 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, inference and/or training logic 115 are used to perform one or more embodiments. Details regarding inference and/or training logic 115 are provided elsewhere herein.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method of performing a non-maximum suppression (NMS) algorithm, the method comprising:
    identifying a plurality of bounding boxes corresponding to one or more objects associated with one or more digital images, wherein each of the plurality of bounding boxes is associated with a confidence score in a first set of confidence scores;
    transforming the first set of confidence scores into a second set of confidence scores within a specified interval, wherein a first portion of each confidence score in the second set of confidence scores is the same;
    sorting the confidence scores in the second set of confidence scores in a descending order according to a remaining portion of each confidence score in the second set of confidence scores; and
    performing a first suppression operation on the second set of confidence scores to remove one or more redundant bounding boxes from the plurality of bounding boxes.

2. The method of claim 1, wherein each of the second set of confidence scores comprises the first portion, a second portion, and a third portion, wherein the first portion of each of the second set of confidence scores is the same and the second portion of each of the second set of confidence scores is the same.

3. The method of claim 1, wherein each of the first set of confidence scores is represented as a floating-point number according to the IEEE 754 format, wherein the floating-point number comprises a sign bit, a biased-exponent field, and a mantissa field, wherein each of the second set of confidence scores comprises same values for the sign bit and the biased-exponent field after the transforming.

4. The method of claim 3, wherein sorting the confidence scores in the second set of confidence scores comprises executing an argsort function on only mantissa bits of the mantissa fields of the second set of confidence scores.

5. The method of claim 3, wherein sorting the confidence scores in the second set of confidence scores comprises executing an argsort function on only a portion of mantissa bits of the mantissa fields of the second set of confidence scores.

6. The method of claim 3, wherein each of the first set of confidence scores is in an interval between zero and one, wherein the specified interval is between one and two, which is clipped by a number of mantissa bits in the mantissa field.

7. The method of claim 1, wherein each of the first set of confidence scores is in an interval between zero and one, wherein the specified interval is a half-open interval between one and two but excluding two.

8. The method of claim 1, wherein the second set of confidence scores is part of a plurality of classes, and wherein the first suppression operation comprises selecting a specified number of bounding boxes having the highest confidence scores in the second set of confidence scores.

9. The method of claim 1, wherein the first set of confidence scores is part of a first class of objects, and wherein the method further comprises:
    identifying a second plurality of bounding boxes corresponding to one or more objects associated with the one or more digital images, wherein each of the second plurality of bounding boxes is associated with a confidence score in a third set of confidence scores, wherein the third set of confidence scores is part of a second class of objects;
    transforming the third set of confidence scores into a fourth set of confidence scores within the specified interval, wherein a first portion of each confidence score in the fourth set of confidence scores is the same;
    sorting the confidence scores in the fourth set of confidence scores in a descending order according to a remaining portion of each confidence score in the fourth set of confidence scores; and
    performing a second suppression operation on the fourth set of confidence scores to remove one or more redundant bounding boxes from the second plurality of bounding boxes.

10. The method of claim 9, further comprising:
    combining the remaining bounding boxes associated with the second set of confidence scores and the fourth set of confidence scores into a third plurality of bounding boxes, wherein each of the third plurality of bounding boxes is associated with a confidence score in a fifth set of confidence scores;
    sorting the confidence scores in the fifth set of confidence scores in a descending order according to a remaining portion of each confidence score in the fifth set of confidence scores; and
    performing a third suppression operation on the fourth set of confidence scores to remove one or more redundant bounding boxes from the second plurality of bounding boxes.

11. A system comprising:
    a memory device; and
    a processing unit coupled to the memory device, the processing unit to:
        identify a plurality of bounding boxes corresponding to one or more objects associated with one or more digital images, wherein each of the plurality of bounding boxes is associated with a confidence score in a first set of confidence scores;
        transform the first set of confidence scores into a second set of confidence scores within a specified interval, wherein a first portion of each confidence score in the second set of confidence scores is the same;
        sort the confidence scores of the second set of confidence scores in a descending order according to a remaining portion of each confidence score in the second set of confidence scores; and
        perform a first suppression operation on the second set of confidence scores in the descending order to remove one or more redundant bounding boxes from the plurality of bounding boxes.

12. The system of claim 11, wherein each of the second set of confidence scores comprises the first portion, a second portion, and a third portion, wherein the first portion of each of the second set of confidence scores is the same and the second portion of each of the second set of confidence scores is the same.

13. The system of claim 11, wherein each of the first set of confidence scores is represented as a floating-point number according to the IEEE 754 format, wherein the floating-point number comprises a sign bit, a biased-exponent field, and a mantissa field, wherein each of the second set of confidence scores comprises same values for the sign bit and the biased-exponent field after the transforming.

14. The system of claim 13, wherein the processing unit is to sort the confidence scores in the second set of confidence scores by executing an argsort function on only mantissa bits of the mantissa fields of the second set of confidence scores.

15. The system of claim 13, wherein the processing unit is to sort the confidence scores in the second set of confidence scores by executing an argsort function on only a portion of mantissa bits of the mantissa fields of the second set of confidence scores.

16. The system of claim 13, wherein each of the first set of confidence scores is in an interval between zero and one, wherein the specified interval is between one and two, which is clipped by a number of mantissa bits in the mantissa field.

17. The system of claim 11, wherein the second set of confidence scores is part of a plurality of classes, and wherein the first suppression operation comprises selecting a specified number of bounding boxes having the highest confidence scores in the second set of confidence scores.

18. The system of claim 11, wherein the first set of confidence scores is part of a first class of objects, and wherein the processing unit is further to:
    identify a second plurality of bounding boxes corresponding to one or more objects associated with the one or more digital images, wherein each of the second plurality of bounding boxes is associated with a confidence score in a third set of confidence scores, wherein the third set of confidence scores is part of a second class of objects;
    transform the third set of confidence scores into a fourth set of confidence scores within the specified interval, wherein a first portion of each confidence score in the fourth set of confidence scores is the same;

sort the confidence scores in the fourth set of confidence scores in a descending order according to a remaining portion of each confidence score in the fourth set of confidence scores;

perform a second suppression operation on the fourth set of confidence scores to remove one or more redundant bounding boxes from the second plurality of bounding boxes;

combine the remaining bounding boxes associated with the second set of confidence scores and the fourth set of confidence scores into a third plurality of bounding boxes, wherein each of the third plurality of bounding boxes is associated with a confidence score in a fifth set of confidence scores;

sort the confidence scores in the fifth set of confidence scores in a descending order according to a remaining portion of each confidence score in the fifth set of confidence scores; and perform a third suppression operation on the fourth set of confidence scores to remove one or more redundant bounding boxes from the second plurality of bounding boxes.

19. A system comprising:

one or more circuits to perform a bit-reduced radix sort operation to sort a list of confidence scores associated with a set of bounding boxes corresponding to one or more objects within one or more digital images and a non-maximum suppression (NMS) operation on the sorted list to remove one or more redundant bounding boxes from the set; and one or more memories to store parameters associated with the NMS operation.

20. The system of claim 19, wherein the one or more circuits, to perform the bit-reduced radix sort operation, is to transform the list of confidence scores into a second list of confidence scores within a specified interval, wherein a first portion of each confidence score in the second list of confidence scores is the same, wherein each confidence score in the list is in an interval between zero and one, wherein the specified interval is a half-open interval between one and two but excluding two.

* * * * *

UNITED STATES PATENT AND TRADEMARK OFFICE
CERTIFICATE OF CORRECTION

PATENT NO. : 11,989,948 B1
APPLICATION NO. : 17/500167
DATED : May 21, 2024
INVENTOR(S) : Zhimeng Fan It is certified that error appears in the above-identified patent and that said Letters Patent is hereby corrected as shown below:

In the Claims

In Claim 10, Column 67, Line 60 please replace "fourth" with --fifth--.

In Claim 18, Column 69, Line 18 please replace "fourth" with --fifth--.

Signed and Sealed this
First Day of October, 2024

Katherine Kelly Vidal
*Director of the United States Patent and Trademark Office*